US008621119B2

(12) United States Patent
Serizawa et al.

(10) Patent No.: US 8,621,119 B2
(45) Date of Patent: Dec. 31, 2013

(54) STORAGE SYSTEM

(71) Applicant: Hitachi, Ltd., Tokyo (JP)

(72) Inventors: Kazuyoshi Serizawa, Tama (JP); Yasutomo Yamamoto, Sagamihara (JP); Norio Shimozono, Machida (JP); Akira Deguchi, Yokohama (JP); Hisaharu Takeuchi, Odawara (JP); Takao Sato, Odawara (JP); Hisao Homma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/740,482

(22) Filed: Jan. 14, 2013

(65) Prior Publication Data
US 2013/0132617 A1 May 23, 2013

Related U.S. Application Data

(63) Continuation of application No. 13/406,377, filed on Feb. 27, 2012, now Pat. No. 8,380,893, which is a continuation of application No. 13/028,164, filed on Feb. 15, 2011, now Pat. No. 8,151,013, which is a continuation of application No. 12/018,818, filed on Jan. 24, 2008, now Pat. No. 7,912,996.

(30) Foreign Application Priority Data

Apr. 23, 2007 (JP) ................. 2007-113449

(51) Int. Cl.
G06F 3/00 (2006.01)
G06F 5/00 (2006.01)

(52) U.S. Cl.
USPC .................. 710/21; 710/28; 710/29; 710/36; 710/38; 710/40; 710/74

(58) Field of Classification Search
None
See application file for complete search history.

(56) References Cited

U.S. PATENT DOCUMENTS 5,720,028 A 2/1998 Matsumoto et al.
6,675,268 B1 1/2004 Dekoning
(Continued)

FOREIGN PATENT DOCUMENTS

EP 1369772 A 12/2003
JP 2003-162377 A 6/2003
(Continued)

OTHER PUBLICATIONS

Japanese Office Action, corresponding to Application No. 2007-113449, dated Aug. 9, 2011.

(Continued)

Primary Examiner — Idriss N Alrobaye
Assistant Examiner — Dayton Lewis-Taylor
(74) Attorney, Agent, or Firm — Sughrue Mion, PLLC

(57) ABSTRACT

A host I/F unit has a management table for managing an MPPK which is in-charge of the control of input/output processing for a storage area of an LDEV, and if a host computer transmits an input/output request for the LDEV, the host I/F unit transfers the input/output request to the MPPK which is in-charge of the input/output processing for the LDEV based on the management table, an MP of the MPPK performs the input/output processing based on the input/output request, and the MP of the MPPK also judges whether the MPPK that is in-charge of the input/output processing for the LDEV is to be changed, and sets the management table so that an MPPK which is different from the MPPK that is in-charge is to be in-charge of the input/output processing for the LDEV.

8 Claims, 22 Drawing Sheets

(56) References Cited

U.S. PATENT DOCUMENTS

| | | |
|---|---|---|
| 7,127,545 B1 | 10/2006 | Nandi et al. |
| 2003/0101317 A1 | 5/2003 | Mizuno et al. |
| 2005/0210188 A1 | 9/2005 | Mizuno et al. |
| 2007/0016667 A1 | 1/2007 | Fujimoto et al. |

FOREIGN PATENT DOCUMENTS

| | | | |
|---|---|---|---|
| JP | 2005-122763 A | 5/2005 | |
| JP | 2005-267545 A | 9/2005 | |
| JP | 2005-301802 A | 10/2005 | |
| WO | 9704384 A | 2/1997 | |
| WO | 0219111 A | 3/2002 | |

OTHER PUBLICATIONS

Office Action in U.S. Appl. No. 13/028,164, dated Mar. 30, 3011.
European Search Report dated Jul. 28, 2009 Issue in Corresponding European Patent Application 08250097.6-1245/1986090.
United States Office Action dated May 27, 2010 Issued in Corresponding U.S. Appl. No. 12/018,818.
United States Notice of Allowance dated Nov. 16, 2010 Issued in Corresponding U.S. Appl. No. 12/018,818.
L. L. Ashton et al., "Two decades of policy-based storage management for the IBM mainframe computer", IBM Systems Journal (0018-8670), 2003, vol. 42, Issue 2, pp. 302-321.
R. Baird et al., "Distributed Information Storage Architecture", Mass Storage Systems, 1993. Putting all that Data to Work. Proceedings of the Twelfth IEEE Symposium on (0-8186-3460-X), pp. 145-155.
R. Baird, "Virtual storage architecture guide (VSAG)", Mass Storage Systems, 1995. Storage—At the Forefront of Information Infrastructures, Proceedings of the Fourteenth IEEE Symposium on (0-8186-7064-9), pp. 312-326.
Connor, Deni, "New HP software manages enterprise storage", Network World, May 15, 2000, pp. 1-3 http://www.networkworld.com/archive/2000/96093_05-15-2000.html.
Notice of Allowance in U.S. Appl. No. 13/028,164, dated Dec. 1, 2011.

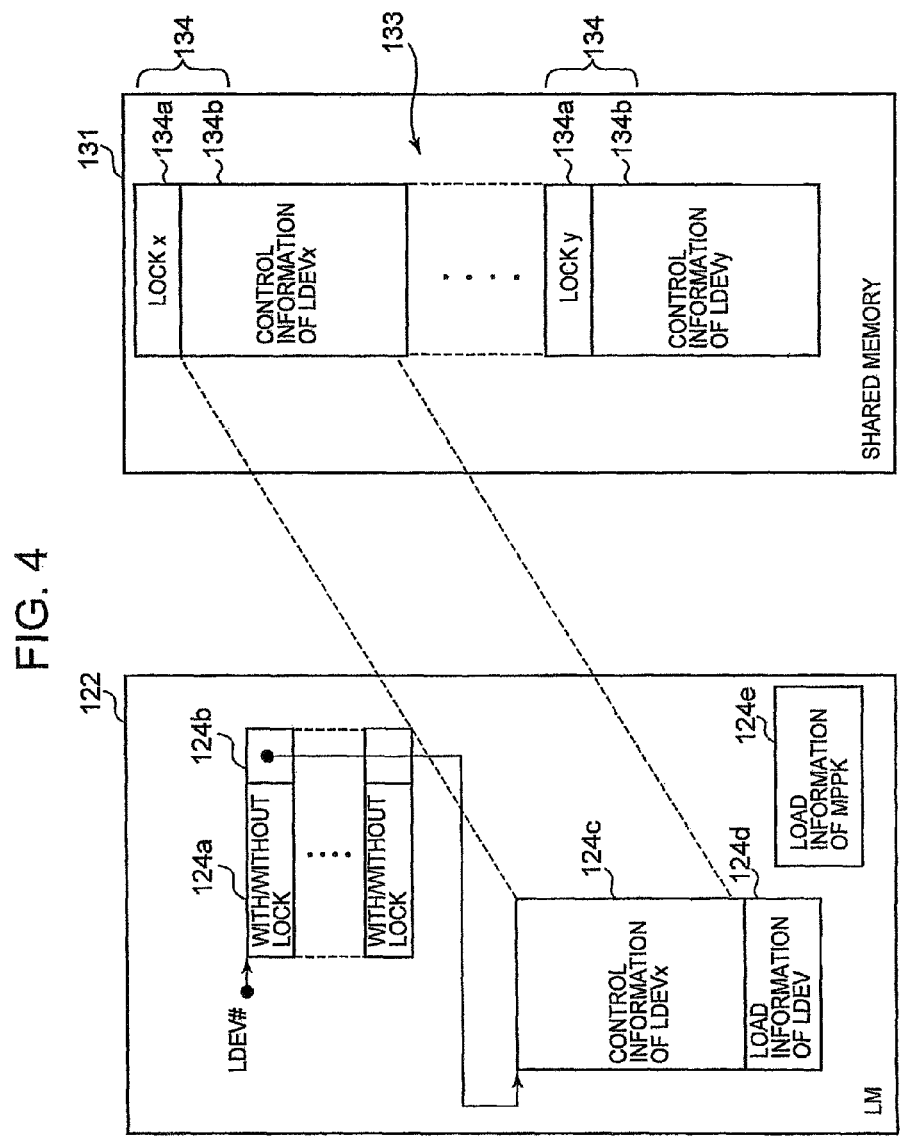

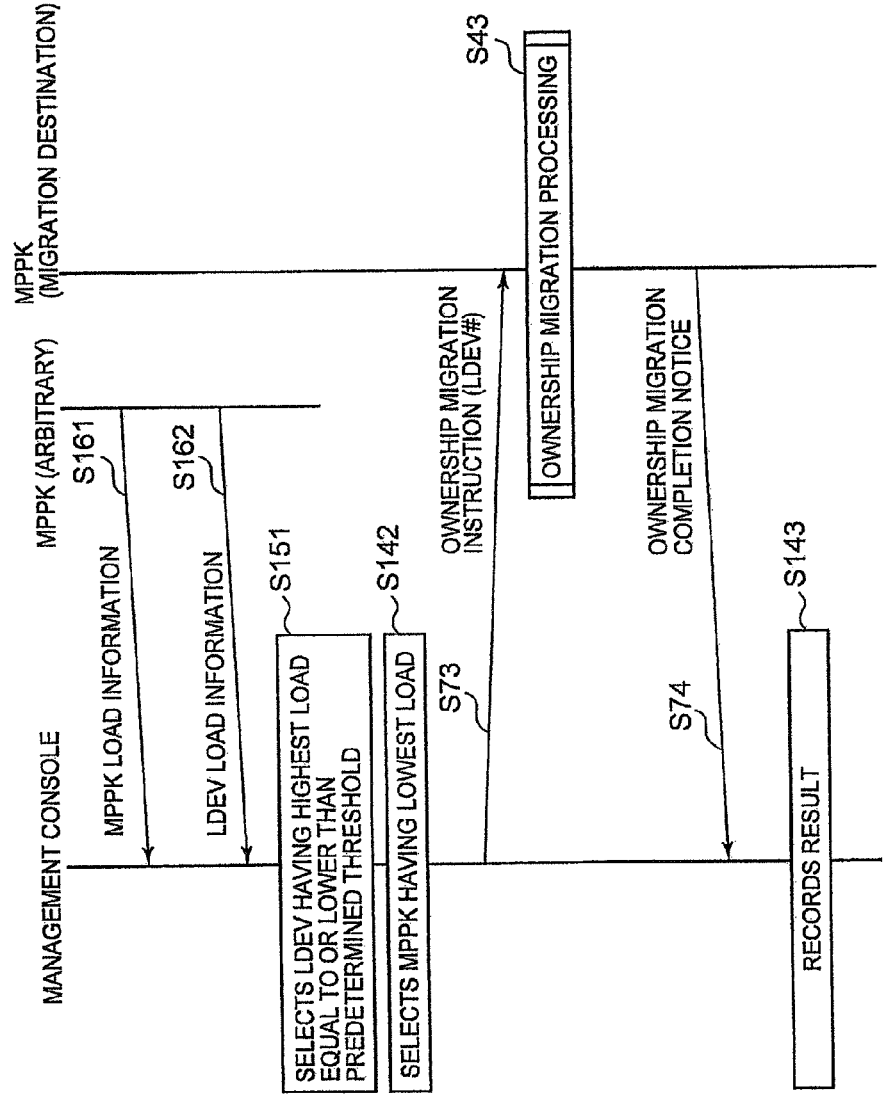

STORAGE SYSTEM

CROSS-REFERENCE TO PRIOR APPLICATION

This is a Continuation of application Ser. No. 13/406,377 filed Feb. 27, 2012, which is a continuation of U.S. application Ser. No. 13/028,164, filed Feb. 15, 2011, now U.S. Pat. No. 8,151,013, which is a continuation application of U.S. application Ser. No. 12/018,818, filed Jan. 24, 2008, now U.S. Pat. No. 7,912,996, which relates to and claims the benefit of foreign priority from Japanese Patent Application number 2007-113449, filed on Apr. 23, 2007. All applications are incorporated herein by reference in their entirety.

BACKGROUND

A storage system can manage a plurality of logical storage devices of which storage areas are a part of storage areas of a plurality of storage devices. In this storage system, logical storage devices can be provided to a host computer so that the host computer can recognize them, and can execute the data input/output processing for the logical storage devices.

In the storage system, if an input/output request is received from the host computer, a microprocessor installed in the storage system controls the input/output processing, such as data write processing to the storage device or data read processing from the storage device according to the input/output request.

Some storage systems have a plurality of microprocessors for executing the input/output processing to/from the storage devices. In such a storage system, a microprocessor, which is in-charge of the input/output processing to/from each logical storage devices, is predetermined, and if an input/output request is received from the host computer, the microprocessor, which is in-charge of the input/output processing for the logical storage device indicated by this input/output request, performs input/output processing based on this input/output request (see Japanese Patent Application Laid-Open No. 2005-301802, for example).

According to the technique disclosed in Japanese Patent Application Laid-Open No. 2005-301802, a microprocessor which performs input/output processing can be set according to the logical storage device indicated by the input/output request, so load on the microprocessors can be balanced.

However, in order to set a microprocessor which is in-charge of a logical storage device, the administrator of the storage system must define the logical storage device and the microprocessor which is in-charge of this logical storage device when the logical storage device is created, and this defining is difficult and takes time.

Also when a logical storage device is created, even if a microprocessor to be in-charge of the logical storage device is determined considering the load of the microprocessor, the load of the microprocessor may not be balanced appropriately as originally designed when the logical storage device is actually used. In the case of a conventional storage device, a way of changing the charge of the logical storage device is not considered.

SUMMARY

With the foregoing in view, it is an object of the present invention to provide a technology for allowing to easily change a processor which is in-charge of a logical storage device. It is another object of the present invention to provide a technology for allowing to set a processor, which is in-charge of a logical storage device, so that setting is transparent to the administrator.

To solve the above problems, a storage system according to one aspect of the present invention is a storage system for performing the input/output processing for a plurality of logical storage devices to which at least a part of the storage areas of a plurality of storage devices are allocated, comprising: a first interface unit that is connected to a host computer; a second interface unit that is connected with the storage device and that performs the data input/output processing with the storage device; a plurality of control units having at least one processor for controlling the input/output processing for the storage area of the logical storage device via the second interface unit; and a communication network for communicably connecting these units, wherein the first interface unit comprises: a management table for managing the control units that are in-charge of control of the input/output processing for the storage area of the logical storage device; and a request transfer unit that transfers an input/output request to the control unit that is in-charge of the input/output processing for the logical storage device based on the management table when the input/output request for the logical storage deice is received from the host computer, and the control unit comprises: a change judgment unit that judges whether the control unit that is in-charge of the input/output processing for the logical storage device is changed; and a setting unit that sets the management table such that the control unit which is different from the control unit in-charge is to be in-charge of the input/output processing for the logical storage device when the change judgment unit judges to change the control unit in-charge.

BRIEF DESCRIPTION OF THE DRAWINGS

FIG. 4 is a diagram depicting an example of a configuration of information managed in LM and a shared memory according to an embodiment of the present invention;

FIG. 22 is a flow chart depicting automatic load balancing adjustment processing according to a fourth modified example of an embodiment of the present invention.

DESCRIPTION OF THE PREFERRED EMBODIMENTS

Embodiments of the present invention will now be described with reference to the drawings. The embodiments to be described below, however, shall not limit the present invention according to the claims. All combinations of features described in the embodiments are not always essential as means of the solutions stated in the present invention.

Figure 1:
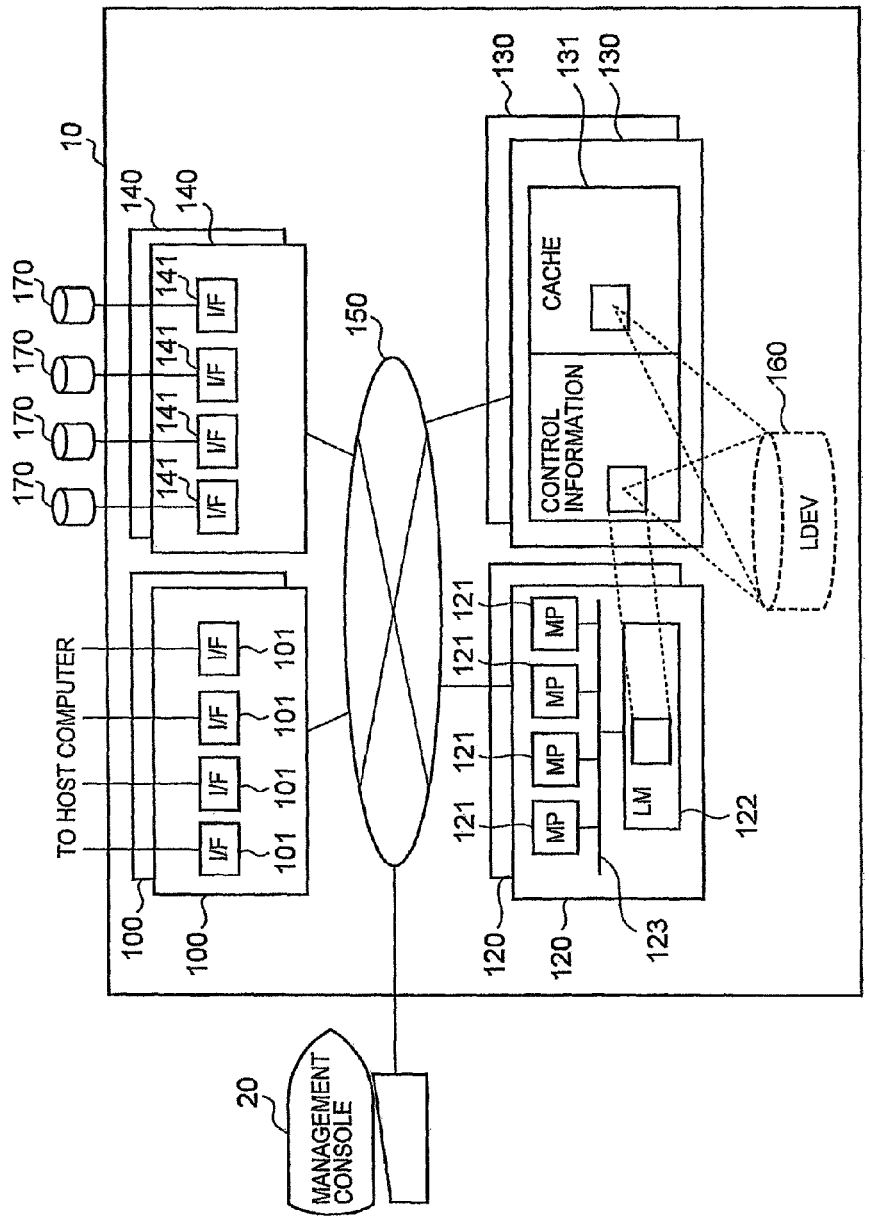
FIG. 1 is a block diagram depicting a computer system according to an embodiment of the present invention.

FIG. 1 is a block diagram depicting a computer system according to an embodiment of the present invention.

The computer system comprises a host computer, which is not illustrated, a storage system 10 and a management console 20. The storage system 10 is connected with one or more host computers which reads and writes data via a cable or network. For a network for connecting with the host computer, any network that can perform data communication can be used, such as a SAN (Storage Area Network), LAN (Local Area Network), Internet, leased line and public line. For a protocol on a network or cable, any protocol can be used if data can be exchanged between the host computer and the storage system 10, such as Fibre Channel protocol or TCP/IP protocol. The read request transmitted from the host computer includes, for example, LUN (Logical Unit Number) and LBA (Logical Block Address) whereby read target data is managed. The write request includes, for example, LUN and LBA, whereby write target data is written, and the write target data.

The storage system 10 has a plurality of host I/F units (I/FPK: I/F package) 100, a plurality of control units (MPPK: micro processor package) 120, a plurality of shared memories (memory PK) 130, a plurality of disk I/F units 140, HDDs (Hard Disk Device) 170 as an example of the plurality of storage devices, and an internal network 150. The internal network 150 connects I/FPKs 100, MPPKs 120, shared memory units 130 and disk I/F units 140 respectively. By means of the internal network 150, each MP 121 of MPPKs 120 can communicate with any of the I/FPKs 100, shared memory units 130 and disk I/F units 140.

The I/FPK 100 has a plurality of host I/Fs 101. The host I/F 101 intermediates the exchange of information on input/output processing with the host computer. The host I/F 101 stores a management table 102 (FIG. 2A) in an internal local memory, which is not illustrated.

Figure 2:
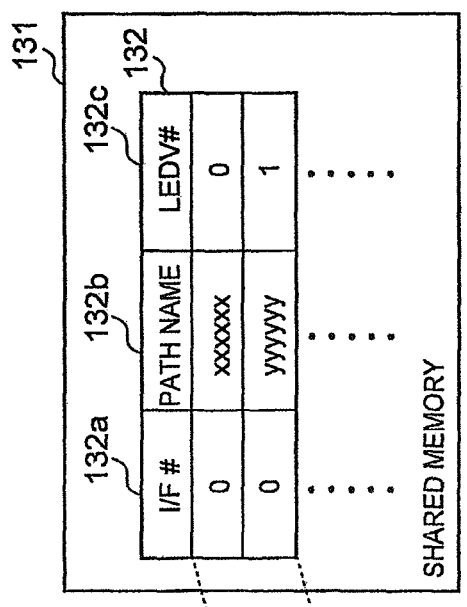
FIG. 2A is a diagram depicting an example of a configuration of a management table according to an embodiment of the present invention.
FIG. 2B is a diagram depicting an example of the configuration of an LDEV number correspondence table.

FIG. 2A is a diagram depicting an example of a configuration of a management table according to an embodiment of the present invention.

The management table 102 has entries, including a path name field 102a and MPPK number (MPPK#) field 102b. In the present embodiment, the management table 102 has entries for the number of path names which can be specified for the hosts I/Fs 101.

A path name (identification information) for referring to an LDEV (logical storage device) from the host computer is stored in the path name field 102a. Here LDEV is a logical storage device which can be referred to from the host computer, and at least a part of the storage areas of the plurality of HDDs 170 are allocated to the storage area of the LDEV. In the path name field 102a, the LUN (Logical Unit Number) is stored if the SCSI standard is used for communication with the host computer, for example. A plurality of path names may be defined for a same LDEV. The host computer transmits an input/output request with specifying a port for referring to the LDEV and a path name of the LDEV, for example, and the host I/F 101 can identify whether the input/output request is addressed to the local port or not by WWN and the port number included in the input/output request.

In the MPPK# field 102b, identification information (e.g. MPPK number) of MPPK 120, which is in-charge of the input/output processing for LDEV indicated by the path name in the path name field 102a in the same entry, is stored. If the MPPK# field 102b is null (e.g. −1 is stored), this means that the input/output processing is disabled for the LDEV indicated by the path name in the same entry. If a plurality of path names are defined for a same LDEV, the MPPK# is the same for each entry. Here the MPPK's right which can be in-charge of the input/output processing for the LDEV is called the "ownership of the LDEV".

In FIG. 1, the host I/F unit 101 can transfer an input/output processing for a certain LDEV only to one MPPK 120 having ownership based on the management table 102. In other words, the host I/F unit 101 can receive an input/output request addressed to a local port from the host computer, acquire an MPPK# corresponding to the path name included in the input/output request from the management table 102, and transfer the input/output request to the MPPK 120 having this MPPK#. In the present embodiment, a number assigned to the host I/F 101 is added to an input/output request transferred from the host I/F 101 to the MPPK 120. Also in the present embodiment, the host I/F 101 adds the input/output request to a queue stored in an LM 122 of the MPPK 120.

In the storage system 10, one or a plurality of LDEVs can be provided using the storage areas of the plurality of HDDs 170. Also in the storage system 10, two or more HDDs 170 in the plurality of HDDs 170 can form a RAID (Redundant Array of Independent Disks) group, so that the storage areas of the RAID group are provided as a storage area of an LDEV.

The disk I/F unit 140 has a plurality of disk I/Fs 141. The disk I/F 141 is connected to the HDD 170 via a cable, for example, and is also connected with the internal network 150, so as to intermediate the transfer processing of read or write target data between the internal network 150 side and the HDD 170.

The shared memory unit 130 has a shared memory 131. The shared memory 131 may be a volatile memory, such as DRAM (Dynamic Random Access Memory). The shared memory 131 temporarily stores (caches) a data to be written to the HDD 170, or temporarily stores (caches) data read from the HDD 170. The shared memory 131 also stores the information required for processing, such as control information for an LDEV, an LDEV number correspondence table, and HDD configuration information. Each of this information will be described later. For an LDEV 160 out of a plurality of LDEVs, for example, data to be stored in the storage area of an LDEV is at least stored(cached) in the shared memory 131, or stored in HDDs 170, and correspondence of an address in the shared memory 131 of the data cached in the LDEV 160 and the storage position thereof in the HDD 170 can be specified by the control information for LDEV, that is in the shared memory 131. In the present embodiment, the control information for an LDEV is also stored in the LM 122 of the MPPK 120 having ownership.

The MPPK 120 has a plurality of MPs (micro processor) 121, a local memory (LM) 122 and a bus 123 connecting these elements.

The LM 122 is used as an area for storing a queue of the input/output requests which are transmitted from the host I/F 101.

Figure 3:
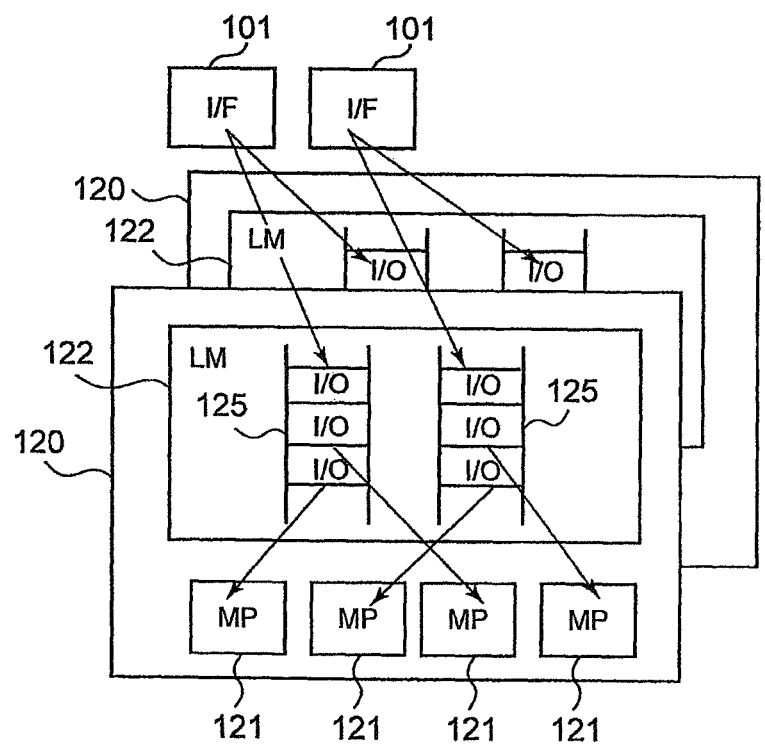
FIG. 3 is an explanatory drawing illustrating queue in LM of MPPK according to an embodiment of the present invention.

FIG. 3 is an explanatory drawing illustrating the queue in the LM of the MPPK according to an embodiment.

In the LM 122 of the MPPK 120, the input/output requests received from each host I/F 101 are stored as the queue 125. In the present embodiment, the queues 125 corresponding to each of the host I/Fs 101, for which the path is defined, are stored in the LM 122.

Referring again to FIG. 1, the LM 122 is used as an area for storing the programs and data of the processing to be executed by the MP 121, or as a work area for storing the data used for processing by the MP 121. In the present embodiment, the LM 122 stores the control information for the LDEV for which this MPPK 120 has ownership, a part of the LDEV number correspondence table, and HDD configuration information, for example. Each of this information will be described later. Compared with the shared memory 131, the LM 122 can be accessed at high-speed from the MP 121. This is because accessing the shared memory 131 from the MP 121 via the internal network 151 has a communication overhead for performing read/write data transfers and exclusive control among a plurality of MPs 121 sharing the shared memory 131.

Each MP 121 executes the input/output processing for an LDEV by executing the programs stored in the LM 122. For example, when the execution of input/output processing becomes enabled, MP 121 acquires (dequeues) one input/output request from one of the queues 125 stored in the LM 122, and executes the input/output processing for the LDEV according to this input/output request. Other processings will be described later. In the present embodiment, a change judgment unit, setting unit, change receive unit, load detection unit, control information acquisition unit, termination request unit, charge termination unit, termination notice transmission unit, identification information acquisition unit, identification information delete unit, delete notice unit, identification information storage unit, creation acceptance unit, charge decision unit, charge registration unit, elimination acceptance unit, charge detection unit, charge termination unit, control information delete unit, elimination request transmission unit and other are implemented by the MP 121 executing the programs stored in the LM 122. Each unit is implemented by the MP 121 executing the programs, but at least a part of the functional units, for example, may be implemented by hardware.

FIG. 2B is a diagram depicting an example of the configuration of the LDEV number correspondence table.

In the LDEV number correspondence table 132, entries, including an I/F number (I/F#) field 132a, path name field 132b, and an LDEV number (LDEV#) field 132c, are stored. In the I/F# field 132a, a number assigned to the host I/F 101 is stored. In the path name field 132b, a path name for referring to the LDEV from the host computer is stored. In the LDEV# field 132c, the identification information of an LDEV (LDEV number) corresponding to the LDEV of the path name in the same entry, which is received by the host I/F 101 of the I/F number of the same entry, is stored.

According to this LDEV number correspondence table 132, the MP 121 can specify an LDEV number based on the path name in the input/output request received from the host I/F 101 and the number of the host I/F 101 received with the input/output request.

In the present embodiment, the LDEV number correspondence table 132 is stored in the shared memory 131 and the LM 122. The LDEV number correspondence table 132 stored in the shared memory 131 has entries corresponding to all the LDEVs of the storage system 10. The LDEV number correspondence table 132 stored in the LM 122 has only entries corresponding to the LDEVs for which the MPPK 120 which this LM 122 belongs to has ownership.

In the present embodiment, the MP 121 can specify the LDEV number of the LDEV for which the MPPK 120 has ownership by referring to the LDEV number correspondence table 132 of the LM 122 of the MPPK 120 which this MP 121 belongs to, so the LDEV number to be the target of the input/output request can be more quickly specified than the case of referring to the shared memory 131.

FIG. 4 is a diagram depicting an example of a configuration of information managed by the LM and the shared memory according to an embodiment of the present invention.

The shared memory 131 stores the control information on all the LDEVs (general control information) 133. The general control information 133 has a plurality of information on the respective LDEV (LDEV individual information) 134. The LDEV individual information 134 has control information on one LDEV (LDEV individual control information) 134b and a lock word 134a for specifying the MPPK 120 which has ownership of this LDEV. In the lock word 134a, an identifier (e.g. MPPK number) of one of the MPPKs 120, for example, is stored. In the present embodiment, the MP 121 of the MPPK 120, where the local MPPK number is not stored in the lock word 134a, is basically managed so that copy, edit, delete and other processings of the LDEV individual control information 134b of the corresponding LDEV and an update for the entries of the corresponding LDEV in the management table of the host I/F 101 cannot be performed.

In LM 122, with/without lock 124a for each LDEV and a pointer 124b are stored. With/without lock 124a for each LDEV is managed such that the MP 121 can access with/without lock 124a for the corresponding LDEV based on the LDEV number. The with/without ownership of the corresponding LDEV is stored in the with/without lock 124a. Here having ownership is also called "locked". If the ownership of the corresponding LDEV is possessed, a pointer to the LDEV individual control information 124c of the corresponding LDEV stored in the LM 122 is stored in the pointer 124b. In the LDEV individual control information 124c, information with the same content as the LDEV individual control information 134b of the corresponding LDEV stored in the shared memory 131 is stored. In the LDEV individual control information 124c, LDEV load information 124d is also corresponded. In the LDEV load information 124d, the input/output processing count per unit time for this LDEV and the load information, such as the data transfer volume per unit time, are stored. In the LM 122, the MPPK load information 124e is stored. In the MPPK load information 124e, load information, such as the operation ratio of MP 121, in the MPPK 120 to which the LM 122 belongs to is stored.

Now the LDEV individual control information 134b for an LDEV will be described in detail. The LDEV individual control information 124c also has a configuration the same as the LDEV individual control information 134b.

The LDEV individual control information 134b includes the address correspondence information 135 and the RAID configuration information 136.

Figure 5A:
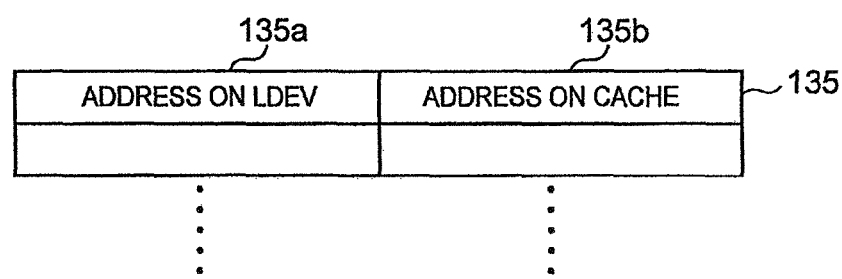
FIG. 5A is a diagram depicting an example of a configuration of address correspondence information according to an embodiment of the present invention.

FIG. 5A is a diagram depicting an example of the configuration of the address correspondence information according to the embodiment of the present invention.

The address correspondence information 135 has entries including an LDEV address field 135a, and a cache address field 135b. In the LDEV address field 135a, each position (address) in the storage area of the LDEV is stored. In the cache address field 135b, a position (address) in the shared memory 131 is stored if the data corresponding to the address of the LDEV of the same entry is stored in the shared memory 131, that is if the data is cached.

According to the address correspondence information 135, if the data corresponding to the address of an LDEV included in the input/output request is stored in the shared memory 131, the MP 121 can acquire the address of the shared memory 131 where this data is stored.

Figure 5B:
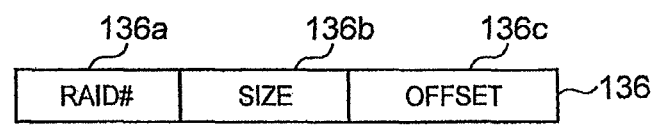
FIG. 5B is a diagram depicting an example of a configuration of RAID configuration information according to an embodiment of the present invention.

FIG. 5B is a diagram depicting an example of a configuration of RAID configuration information according to the embodiment of the present invention.

The RAID configuration information 136 has a RAID number (RAID#) 136a, size 136b and offset 136c. The RAID number 136a is an identifier (e.g. number) for identifying a RAID group where a corresponding LDEV is stored in the storage system 10. The size 136b is a size of the storage area of the corresponding LDEV, that is the storage capacity. The offset 136c is an offset value of the first position of the RAID group and the position of the corresponding LDEV is stored.

According to the RAID configuration information 136, the MP 121 can specify a RAID group where a predetermined address of an LDEV is stored and a storage position (address) in a RAID group. In other words, the RAID group can be specified by the RAID number, and the first position of the LDEV in the RAID group can be specified by the offset. Therefore based on the address of the LDEV included in the input/output request, the corresponding address in the RAID group can be specified.

In the shared memory 131, the HDD configuration information 137 is also stored. The HDD configuration information 137 may also be stored in the LM 122 of the MPPK 120.

Figure 5C:
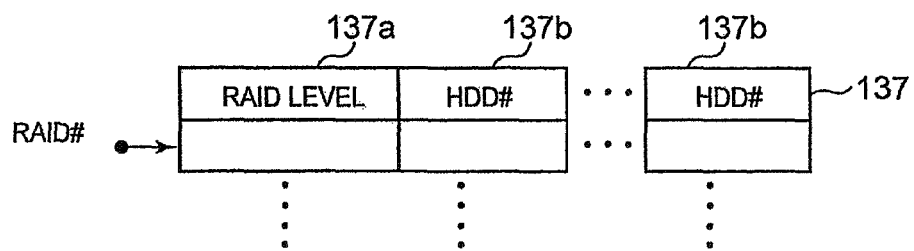
FIG. 5C is a diagram depicting an example of a configuration of HDD configuration information according to an embodiment of the present invention.

FIG. 5C is a diagram depicting an example of a configuration of HDD configuration information according to the embodiment of the present invention.

The HDD configuration information 137 has a plurality of entries including a RAID level field 137a and a plurality of HDD number (HDD#) fields 137b. The HDD configuration information 137 is created such that the MP 121 can access the entry of the corresponding RAID group based on the RAID number.

A RAID level in the corresponding RAID group is stored in the RAID level field 137a. For example, RAID1 or RAID5 is stored in the RAID level field 137a. An identifier (e.g. HDD number) of one of the HDDs 170 constituting the corresponding RAID group is stored in the HDD number field 137b.

According to the HDD configuration information 137, the MP 121 of the MPPK 120 can know the HDD 170 where input/output is actually performed and a position (address) in the HDD 170 based on the RAID group and an address in the RAID group. In other words, the RAID level of the RAID group can be known based on the number assigned to the RAID group where the target LDEV of the input/output processing is managed. Then from the position in the RAID group corresponding to the position of the input/output target LDEV, the detected RAID level and the number assigned to the HDD 170 constituting the RAID group, the HDD 170 where input/output is actually performed and the address in the HDD 170 can be known.

Now the management console 20 will be described.

Figure 6:
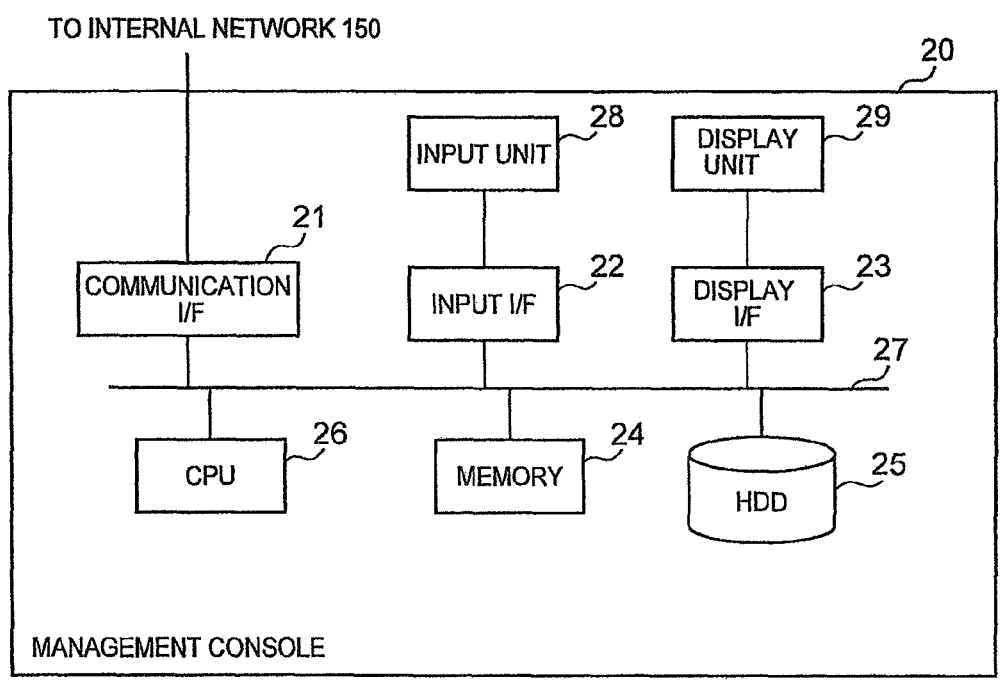
FIG. 6 is a block diagram depicting a management console according to an embodiment of the present invention.

FIG. 6 is a block diagram depicting the management console according to the embodiment of the present invention.

In the management console 20, a communication I/F 21, input I/F 22, display I/F 23, memory 24, HDD 25 and CPU (Central Processing Unit) 26 are connected via a bus 27.

The memory 24 has a ROM (Read Only Memory) or a RAM (Random Access Memory), for example, and stores a boot program and the programs for executing various processings. The memory 24 is also used as an area for storing programs and data, or as a work area for storing data to be used for processing by the CPU 26. The HDD 25 stores programs and various information that must be stored even when power is not ON.

The input unit 28, which accepts operations by the user (administrator) of the management console 20, such as mouse or keyboard, is connected to the input I/F 22. The input I/F 22 outputs the signals from the input unit 28 to the CPU 26 as data. The display unit 29, such as a liquid crystal display or a CRT, is connected to the display I/F 23. The display I/F 23 has a VRAM (Video Random Access Memory), for example, generates image data according to the image to be displayed, and outputs and displays various screens on the display unit 29 based on the control of the CPU 26. The communication I/F 21 is connected to the internal network 150 of the storage system 10, and intermediates the data exchange between the CPU 26 and each unit (e.g. MP 121 of MPPK 120) of the storage system 10 connected to the internal network 150.

The CPU 26 controls the operation of each unit 21 to 25. The CPU 26 also reads the programs stored in the memory 24 and/or HDD 25 into the RAM of the memory 24, and executes them. In the present embodiment, the creation instruction acceptance unit, control unit decision unit, creation instruction transmission unit, collection unit, change specification acceptance unit and change instruction transmission unit are mainly implemented by the CPU 26 executing the programs stored in the memory 24 and/or HDD 25.

The CPU 26 displays many kinds of images on the display unit 29 via the display I/F 23. For example, the CPU 26 acquires the information on the identification information of an LDEV stored in the shared memory 131 and the RAID group number where the LDEV belongs, and displays the LDEV management screen on the display screen 29a of the display unit 29 via the display I/F 23 based on this information.

Figure 7:
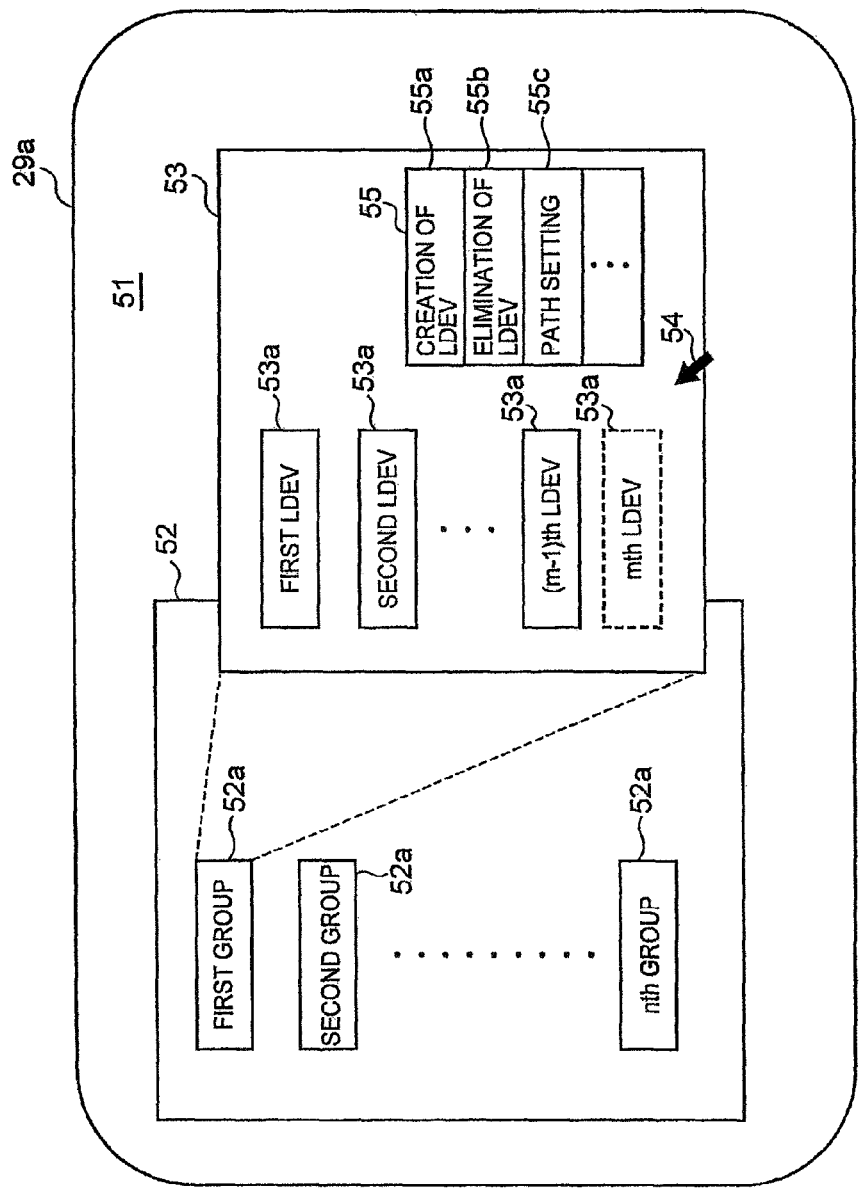
FIG. 7 is a diagram depicting an LDEV management screen according to an embodiment of the present invention.

FIG. 7 is a diagram depicting the LDEV management screen according to the embodiment of the present invention.

A RAID group display area 52 and an LDEV display area 53 are displayed on the LDEV management screen 51. A cursor 54 is also displayed on the LDEV management screen 51 which can move on the screen according to the operation by the user via the input unit 28.

An image (RAID group image) 52a, to indicate each RAID group of the storage system 10, is displayed on the RAID group display area 52. An image (LDEV image) 53a, to indicate an LDEV allocated to the specified RAID group, is displayed on the LDEV display area 53.

On the RAID group display area 52, if the user moves the cursor 54 onto a RAID group image 52a via the input unit 28 and clicks the left button of the mouse of the input unit 28 twice (double click), the LDEV image 53a of the LDEV, which is allocated to the RAID group corresponding to the RAID group image 52a where the cursor 54 positions, is displayed on the LDEV display area 53 by the CPU 26.

If the user clicks the right button of the mouse (right click) of the input unit 28 when the cursor 54 is positioned in the LDEV display area 53, an LDEV processing window 55 is displayed by the CPU 26. In the LDEV processing window 55, an LDEV creation button 55a for starting processing to extend a new LDEV in this RAID group, an LDEV elimination button 55b for starting processing to eliminate an LDEV corresponding to the LDEV image 53a selected in the LDEV display area 53, and a path setting button 55c for starting processing to set a path of an LDEV corresponding to the LDEV image 53a selected in the LDEV display area 53, for example, are displayed. If the LDEV creation button 55a is selected by the cursor 54, a screen for inputting the information required for creation of the LDEV is displayed, where LDEV creation processing can be performed. In LDEV creation processing, the user inputs the number and the size of the LDEV to be created, for example. Therefore the administrator need not set information considering the MPPK 120 which is in-charge of the input/output processing for an LDEV. If the LDEV elimination button 55b is selected by the cursor 54, the processing to eliminate the selected LDEV is started by the CPU 26. If the path setting button 55c is selected by the cursor 54, a screen for inputting information required for path setting is displayed, where path setting processing can be performed. In the path setting processing, the user inputs the number assigned to the host I/F 101 which sets the path, and path name, for example. Therefore the administrator need not set information considering the MPPK 120 which is in-charge of the input/output processing for an LDEV.

The CPU 26 also acquires the load information of an MP 121 from each MPPK 120 and the load information of the LDEV of which ownership is held by each MPPK 120, and displays a tuning screen on the display screen 29a of the display unit 29 via the display I/F 23.

Figure 8:
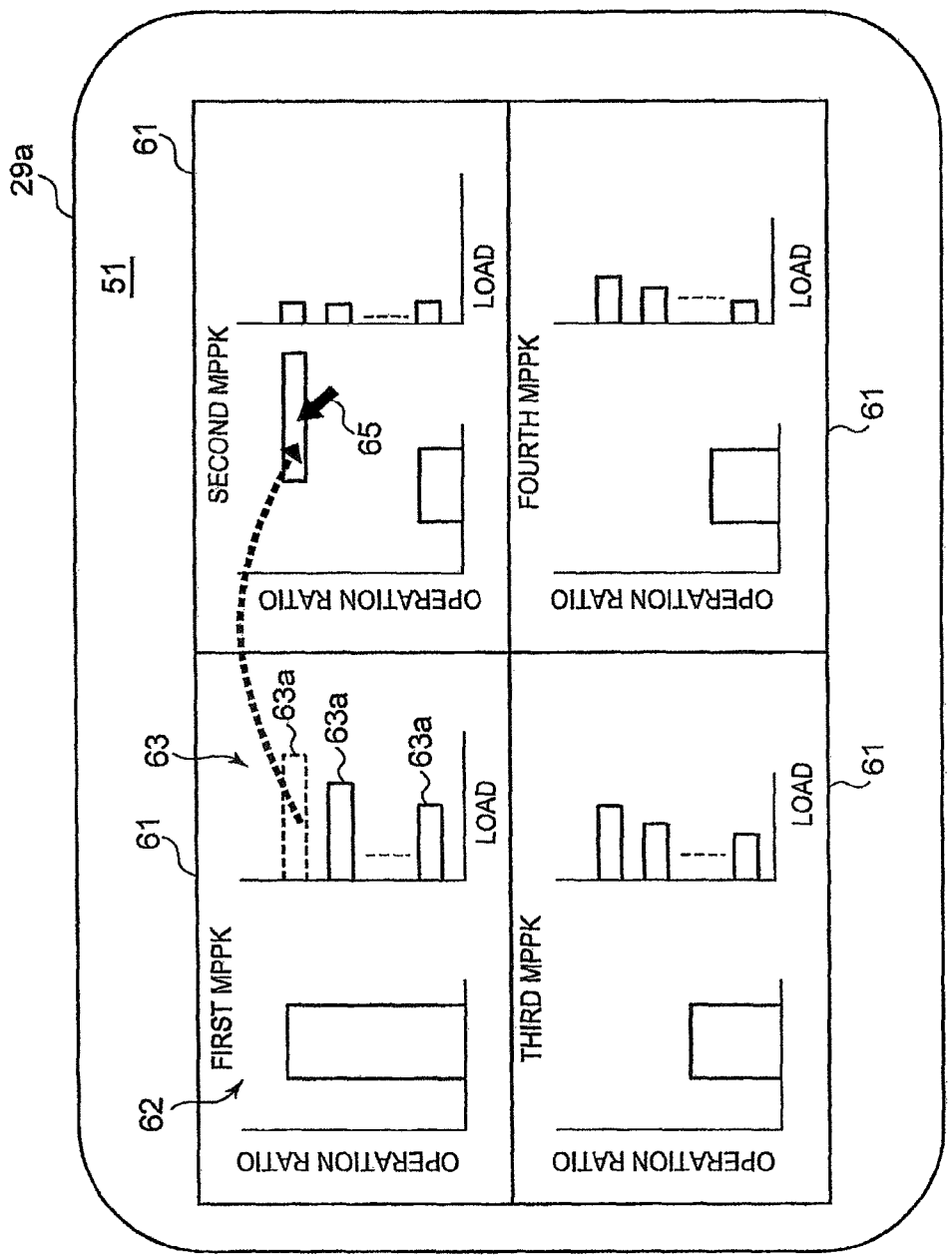
FIG. 8 is a diagram depicting a tuning screen according to an embodiment of the present invention.

FIG. 8 is a diagram depicting the tuning screen according to the embodiment of the present invention.

A plurality of MPPK individual status display areas 61 for indicating the status of each MPPK 120 are displayed on the tuning screen 60. A cursor 65, which can move on the screen by the operation of the user via the input unit 28, is also displayed on the tuning screen 60. The MPPK individual status display areas 61 corresponding to all the MPPKs 120 of the storage system 10 may be provided as one screen, or may be provided as a plurality of screens where a screen to be displayed is switched.

An MP load display area 62 for displaying the load information of the MP 121 in the corresponding MPPK 120 and an LDEV load display area 63 for displaying the load information of an LDEV of which ownership is held by the corresponding MPPK 120 are displayed on the MPPK individual status display areas 61.

According to the present embodiment, a graph of which vertical axis indicates the operation ratio of the MP 121 is displayed in the MP load display area 62. In the present invention, graphs 63a, of which horizontal axis indicates the load of the LDEVs, are also displayed in the LDEV load display area 63, sequentially, from the LDEV having a higher load, from the top.

By the tuning screen 60, the user (administrator) of the management console 20 can easily know the load of the MP 121 of each MPPK 120 visually, and can also know the load of the LDEVs of which ownership are held by each MPPK 120 visually.

If there is an LDEV for which the MPPK 120 in-charge of the input/output processing that must be changed, the change can be easily instructed on the tuning screen 60. In other words, on the tuning screen 60, the user positions the cursor 65 over the graph 63a which indicates the LDEV of which charge must be changed, moves the mouse of the input unit 28 while continually pressing down on the right button of the mouse of the input unit 28, so as to move the graph 63a to an MPPK individual status display area 61 of a new MPPK 120 which is to be in-charge, and releases the right button of the mouse, that is, the graph 63a of the LDEV is dragged and dropped, then the CPU 26 accepts the LDEV corresponding to this graph 63a as an instruction to set this new MPPK 120 of this MPPK individual status display area 61 to be in-charge. For example, if the LDEV of which the first MPPK is in-charge is changes such that the second MPPK is to be in-charge, the graph 63a, to indicate the LDEV in the MPPK individual status display area 61 (upper left in FIG. 8) corresponding to the first MPPK, is dragged and dropped onto the MPPK individual status display area 61 (upper right in FIG. 8) corresponding to the second MPPK as indicated by broken lines in FIG. 8.

Now each processing in the storage system according to this embodiment will be described. First LDEV creation processing, when a new LDEV is created in the storage system 10, will be described. This LDEV creation processing is executed in the initial status where no LDEV is set in the storage system 10, or when an LDEV is added to the LDEVs already set, for example. The same processing is also executed during consolidation when a plurality of storage systems are integrated in the storage system 10.

Figure 9:
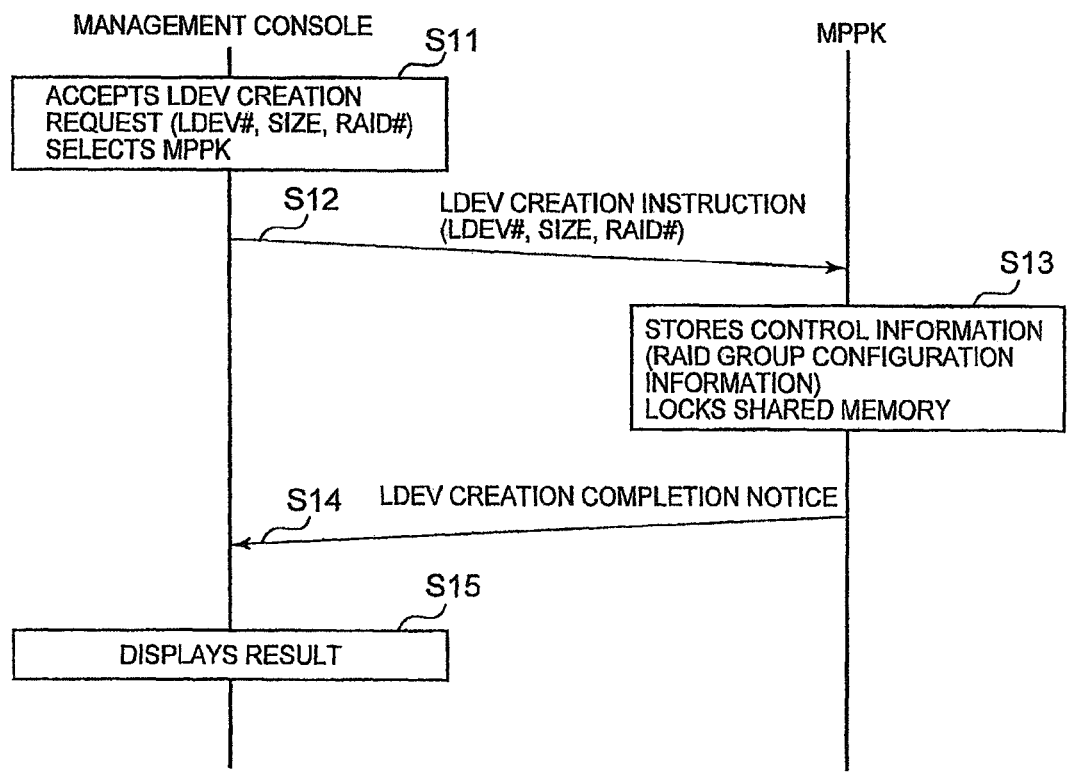
FIG. 9 is a flow chart depicting LDEV creation processing according to an embodiment of the present invention.

FIG. 9 is a flow chart depicting LDEV creation processing according to the embodiment of the present invention.

In LDEV creation processing, the CPU 26 of the management console 20 accepts an LDEV creation request by the operation of the user via the input unit 28. According to the present embodiment, the CPU 26 accepts a number assigned to the LDEV to be created, a size of the LDEV, and a RAID group number by the operation of the user via the input unit 28. In consolidation, the user must specify these according to the setting information of each LDEV in the storage system before integration.

Then the CPU 26 selects an MPPK 120 to be in-charge of the input/output processing for this LDEV out of the plurality of MPPKs 120 (step S11). Here the CPU 26 may select an MPPK 120 in round-robin manner, for example, or may select it at random. Since the CPU 26 selects an MPPK 120 to be in-charge of the LDEV when the LDEV is created, the user need not set it.

Then the CPU 26 transmits the LDEV creation instruction including the accepted LDEV number, size of LDEV and RAID group number to the selected MPPK 120 via the communication I/F 21 and the internal network 150 (step S12). In the following description, description on the communication I/F 21 and the internal network 150 which intermediates the information may be omitted.

The MP 121 of the MPPK 120 at the transmission destination receives the LDEV creation instruction via the internal network 150. Then the MP 121 stores the received RAID group number and size in the RAID configuration information 136 of the LDEV corresponding to the LDEV number in the LDEV creation instruction, in the LM 122 and the shared memory 131. The MP 121 also specifies an allocatable position in the RAID group and stores the offset of this position in the RAID configuration information 136. The MP 121 also locks the LDEV individual control information of this LDEV. In other words, the MP 121 stores, in the shared memory 131, an identifier of the MPPK 120 to which this MP 121 belongs to a lock word 134a of the corresponding LDEV. The MP 121 also sets "with lock" to the with/without lock field 124a of the corresponding LDEV in the LM 122, and sets a pointer to the LDEV individual control information 124c to the pointer 124b (step S13).

Then the MP 121 transmits the LDEV creation completion notice to indicate completion of the LDEV creation to the management console 120 (step S14).

When the CPU 26 receives the LDEV creation completion notice in the management console 20, the CPU 26 displays the result to indicate completion of LDEV creation on the display unit 29 (step S15).

To extend a plurality of LDEVs, the above processing is executed repeatedly. In the case of consolidation, LDEVs similar to the LDEVs of the storage system before integration are created by the above processing, then the data stored in the LDEVs of the storage system before integration are stored in the LDEVs created in the storage system 10.

Now the path setting processing for allowing accessing the created LDEV from the host computer will be described.

Figure 10:
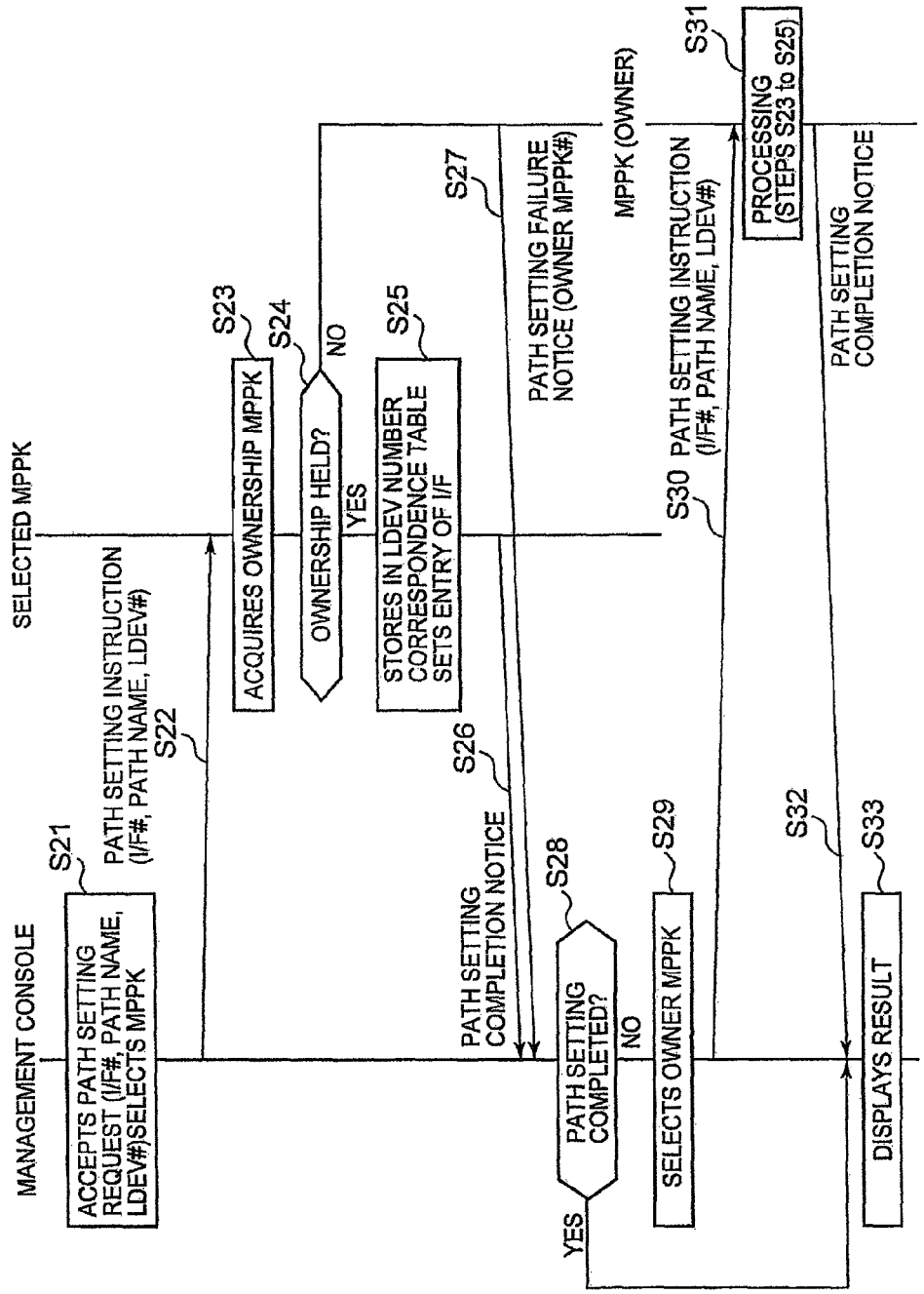
FIG. 10 is a flow chart depicting a path setting processing according to an embodiment of the present invention.

FIG. 10 is a flow chart depicting the path setting processing according to the embodiment of the present invention.

In the path setting processing, the CPU 26 of the management console 20 accepts a path setting request by the operation of the user via the input unit 28. According to the present embodiment, the CPU 26 accepts the number assigned to the host I/F 101 which accepts input from the host computer (I/F number), a path name that indicates the LDEV, and a number assigned to the LDEV (LDEV number) to which the path is set, by the operation of the user via the input unit 28.

Then the CPU 26 selects an MPPK 120 to be the transmission destination of the path setting instruction, out of a plurality of MPPKs 120 (step S21). Here the CPU 26 may select an MPPK 120 in round-robin manner, for example, or may select it at random. Since the CPU 26 selects an MPPK 120 to be the instruction transmission destination in the path setting processing, the user need not select it. Therefore the transmission destination MPPK number need not be displayed on the display unit 28, and even if it is displayed, the user need not select the transmission destination MPPK 120.

Then the CPU 26 transmits the path setting instruction, including the accepted I/F number, path name and LDEV number, to the selected MPPK 120 via the communication I/F 21 and the internal network 150 (step S22).

The MP 121 of the MPPK 120 at the transmission destination receives the path setting instruction via the internal network 150. Then the MP 121 acquires the MPPK number of the MPPK 120 which has ownership of the LDEV having the LDEV number included in the path setting instruction from the shared memory 131 (step S23). The MPPK number of the MPPK 120 having ownership can be acquired from the lock word 134a of the corresponding LDEV in the shared memory 131.

Then the MP 121 judges whether the local MPPK 120, which this MP 121 belongs to, has ownership of the path setting target LDEV based on whether the acquired MPPK number corresponds the MPPK number of the local MPPK 120 (step S24).

If the acquired MPPK number matches the MPPK number of the local MPPK 120, that is the local MPPK 120 has ownership of the path setting target LDEV (YES in step S24), the MP 121 registers the entry including the I/F number, path name and LDEV number in the path setting instruction in the LDEV number correspondence table 132 in the LM 122 and the shared memory 131. The MP 121 also stores the received RAID group number and the size in the RAID configuration information 136. Also the MP 121 sets the entry, including the path name in the path setting instruction and the MPPK number of the local MPPK 120 in the management table 102 of the host I/F 101 indicated by the I/F number in the path setting instruction (step S25), then the MP 121 notifies the path setting completion notice to the management console 20 (step S26).

On the other hand, if the acquired MPPK number does not match the MPPK number of the local MPPK 120, that is the local MPPK 120 does not have ownership of the path setting target LDEV (NO in step S24), then the information on this LDEV cannot be updated. Therefore the MP 121 includes the acquired MPPK number of the MPPK 120 having ownership in the path setting failure notice, and transmits it to the management console 20 (step S27).

The CPU 26 of the management console 20 judges whether path setting is completed, that is whether the path setting completion notice is received (step S28), and if the path setting completion notice is received, the CPU 26 displays the result to indicate completion of the path setting on the display unit 29 (step S33).

On the other hand, if path setting is not completed, that is if the path setting failure notice is received, the CPU 26 selects the MPPK 120 having the MPPK number included in the path setting failure notice as the transmission destination (step S29), and transmits the path setting instruction including the I/F number, path name and LDEV number to this MPPK 120 (step S30).

The MP 121 of the MPPK 120 which received the path setting instruction executes the processing in step S23 to step S25 (step S31). The MPPK 120 has ownership in this case, so the processing corresponding to step S25 is executed in step S31.

Then the MP 121 notifies the path setting completion notice to the management console 20 (step S32). Then the CPU 26 of the management console 20, which received the path setting completion notice, displays the result to indicate completion of path setting on the display unit 29 (step S33).

According to the above mentioned path setting processing, even if the MPPK 120 initially selected as the transmission destination of the path setting instruction does not have ownership of the corresponding LDEV, the path setting instruction can then be transmitted to the MPPK 120 having ownership of the corresponding LDEV to have the path setting executed. Therefore the management console 20 need not know the MPPKs having ownership of the LDEVs. Even if the storage system 10 independently shifts ownership of the LDEV without involving the management console 20, path setting can be performed without problems.

Now LDEV elimination processing for eliminating a created LDEV will be described.

Figure 11:
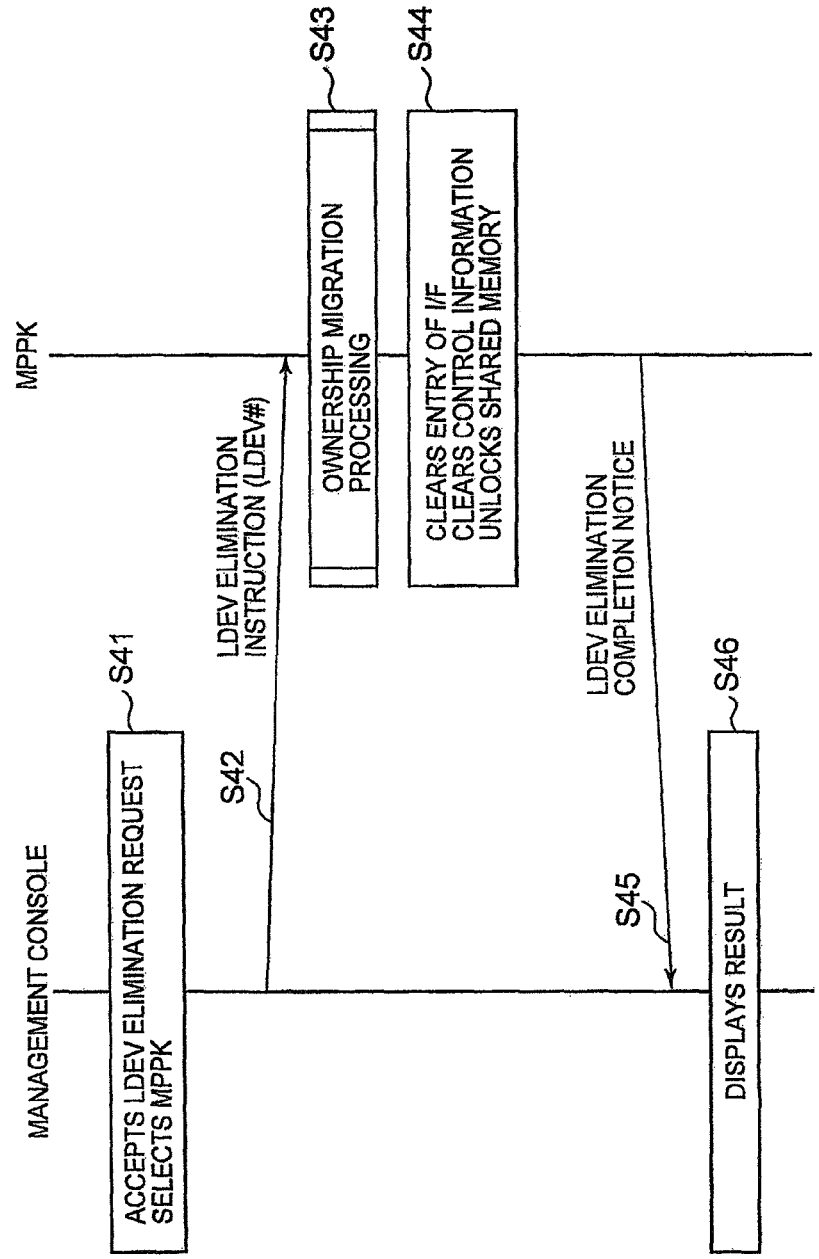
FIG. 11 is a flow chart depicting LDEV elimination processing according to an embodiment of the present invention.

FIG. 11 is a flow chart depicting the LDEV elimination processing according to the embodiment of the present invention.

In the LDEV elimination processing, the CPU 26 of the management console 20 accepts an LDEV elimination request by the operation of the user via the input unit 28. According to the present embodiment, the CPU 26 accepts the specification of the LDEV to be eliminated by the operation of the user via the input unit 28, for example, while the LDEV management screen 51 is being displayed. Then the CPU 26 selects an MPPK 120 that executes the elimination of this LDEV out of the plurality of MPPKs 120 (step S41). Here the CPU 26 may select an MPPK 120 in round-robin manner, for example, or may select it at random. Since the CPU 26 selects the MPPK 120 that executes the elimination when the LDEV is eliminated, the user need not specify it.

Then the CPU 26 transmits the LDEV elimination instruction including the LDEV number corresponding to the accepted LDEV to the selected MPPK 120 via the communication I/F 21 and the internal network 150 (step S42).

The MP 121 of the MPPK 120 at the transmission destination receives the LDEV elimination instruction via the internal network 150. Then the MP 121 obtains ownership of the elimination target LDEV by executing the later mentioned ownership migration processing (step S43).

Then the MP 121 acquires the I/F number and the path name corresponding to the LDEV number of the elimination target LDEV from the LDEV number correspondence table 132 stored in the LM 122, and deletes the entry including this path name from the management table 102 of the host I/F 101 corresponding to this I/F number. The MP 121 deletes the LDEV individual control information 124c and the LDEV load information 124d for the elimination target LDEV from the LM 122, and sets the with/without lock 124a corresponding to this LDEV to without lock, and sets the pointer 124b to null. The MP 121 also deletes the LDEV individual control information 134b of the corresponding LDEV from the shared memory 131, and unlocks the control information of the LDEV in the shared memory 131, that is stores a null value (e.g. −1) in the lock word 134a of the corresponding LDEV (step S44).

Then the MP 121 transmits the LDEV elimination completion notice to the management console 20 (step S45). The CPU 26 of the management console 20, which received the LDEV elimination completion notice, displays the result to indicate completion of the LDEV elimination on the display unit 29 (step S46).

According to the above mentioned LDEV elimination processing, even if the MPPK 120 initially selected as the destination of transmitting the LDEV elimination instruction does not have ownership of the corresponding LDEV, the LDEV can be eliminated. Therefore the management console 20 need not know the MPPKs having ownership of the LDEVs.

Now the ownership migration processing will be described.

Figure 12:
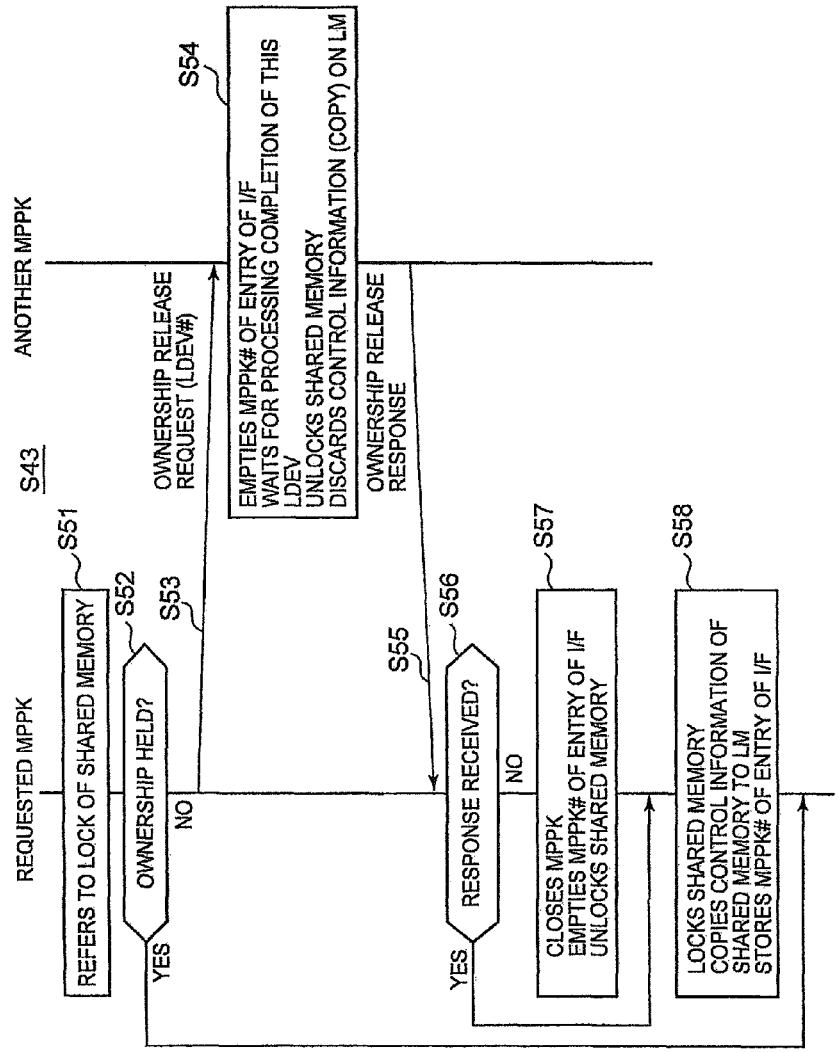
FIG. 12 is a flow chart depicting ownership migration processing according to an embodiment of the present invention.

FIG. 12 is a flow chart depicting the ownership migration processing according to the embodiment of the present invention.

Prior to performing the ownership migration processing, the MP 121 has acquired the LDEV number of the target LDEV for which ownership is obtained. In the ownership migration processing, the MP 121 of the MPPK 120 at the ownership obtaining side refers to the lock of the target LDEV for which ownership to obtain in the shared memory 131. In other words, the MP 121 acquires the MPPK number of the MPPK 120, which has ownership of the ownership migration target LDEV, from the shared memory 131 (step S51).

Then the MP 121 judges whether the local MPPK 120, to which this MP 121 belongs, has ownership of the ownership migration target LDEV depending on whether the acquired MPPK number corresponds the MPPK number of the local MPPK 120 (step S52).

If the acquired MPPK number matches the MPPK number of the local MPPK 120 as a result (YES in step S52), this means that the local MPPK 120 has ownership of this LDEV, so the ownership migration processing ends.

On the other hand, if the acquired MPPK number does not match the MPPK number of the local MPPK 120 (NO in step S52), this means that the local MPPK 120 does not have ownership of this LDEV, so the MP 121 transmits an ownership release request, including the LDEV number of the ownership migration target LDEV, to the MPPK 120 having the acquired MPPK number via the communication I/F 21 and the internal network 150, that is transmits it to the MPPK 120 having ownership of the target LDEV (step S53).

The MP 121 of the MPPK 120 at the transmission destination receives the ownership release request via the internal network 150. When the ownership release request is received, the MP 121 acquires the I/F number and the path name corresponding to the LDEV number included in the ownership release request from the LDEV number correspondence table 132 stored in the LM 122. Then the MP 121 sets the MPPK number in the entry including this path name to null (e.g. −1) in the management table 102 of the host I/F 101 corresponding to this I/F number. This can prevent transferring a new input/output request for the target LDEV from the host I/F 101 to this MPPK 120.

Then the MP 121 waits until the input/output processing for this LDEV is completed. The completion of the input/output processing for the LDEV can be known, for example, by the absence of input/output requests for the target LDEV in the queue stored in the LM 122 of the MPPK 120. This can prevent a status where an already accepted input/output processing for the LDEV cannot be executed.

Then the MP 121 deletes the LDEV individual control information 134b of the corresponding LDEV from the shared memory 131, and unlocks the control information of the LDEV in the shared memory 131, that is stores a null value (e.g. −1) in the lock word 134a of the corresponding LDEV. The MP 121 also deletes the LDEV individual control information 124c for the target LDEV and the LDEV load information 124d from the LM 122, sets the with/without lock 124a corresponding to this LDEV to without lock, and sets the pointer 124b to null (step S54).

Then the MP 121 transmits an ownership release response to indicate that the ownership release is executed to the request source MPPK 121 (step S55).

The MP 121 of the MPPK 120 at the ownership obtaining side judges whether the ownership release response is received within a predetermined time (step S56). If the ownership release response is not received within the predetermined time (NO in step S56), this could mean that failure occurred to the MPPK 120 which has transmitted the ownership release request, so processing to close this MPPK 120 is executed. For this processing to close the MPPK 120, resetting MPPK 120 or stopping the supply of power to MPPK 120, for example, may be used. Then the MP 121 acquires the I/F number and the path name corresponding to the target LDEV number from the LDEV number correspondence table 132 stored in the shared memory 131. Then in the management table 102 of the host I/F 101 corresponding to this I/F number, the MP 121 sets the MPPK number of the entry that includes this path name to a null value (e.g. −1). Also the MP 121 unlocks the control information of the LDEV in the shared memory 131, that is stores the null value (e.g. −1) to the lock word 134*a* of the corresponding LDEV (step S57).

If step S57 is executed or if the ownership release response is received within a predetermined time (YES in step S56), the MP 121 locks the control information of the target LDEV in the shared memory 131, that is stores the local MPPK number to the lock word 134*a* of the corresponding LDEV. Then the MP 121 acquires the LDEV individual control information 134 of the target LDEV from the shared memory 131, and copies it to the LM 122. By this, the LDEV individual control information 124*c* of the corresponding LDEV exists in the LM 122. The MP 121 also acquires the entry having the LDEV number of the target LDEV from the LDEV number correspondence table 132 of the shared memory 131, and stores it in the LM 122. The MP 121 also sets the with/without lock 124*a* corresponding to the target LDEV of the LM 122 to with lock, and sets the pointer for the beginning of the LDEV individual control information 124*c* of the LM 122 to the pointer 124*b*. The MP 121 also acquires the I/F number and the path name corresponding to the LDEV number of the target LDEV from the LDEV number management table 132 of the LM 122. Then in the management table 102 of the host I/F 101 corresponding to this I/F number, the MP 121 stores the local MPPK number to the MPPK number of the entry that includes this path name (step S58). By this, the MPPK 120 can secure the ownership of the target LDEV, and can execute the input/output processing for the target LDEV.

Now the tuning screen display processing for displaying the tuning screen will be described.

Figure 13:
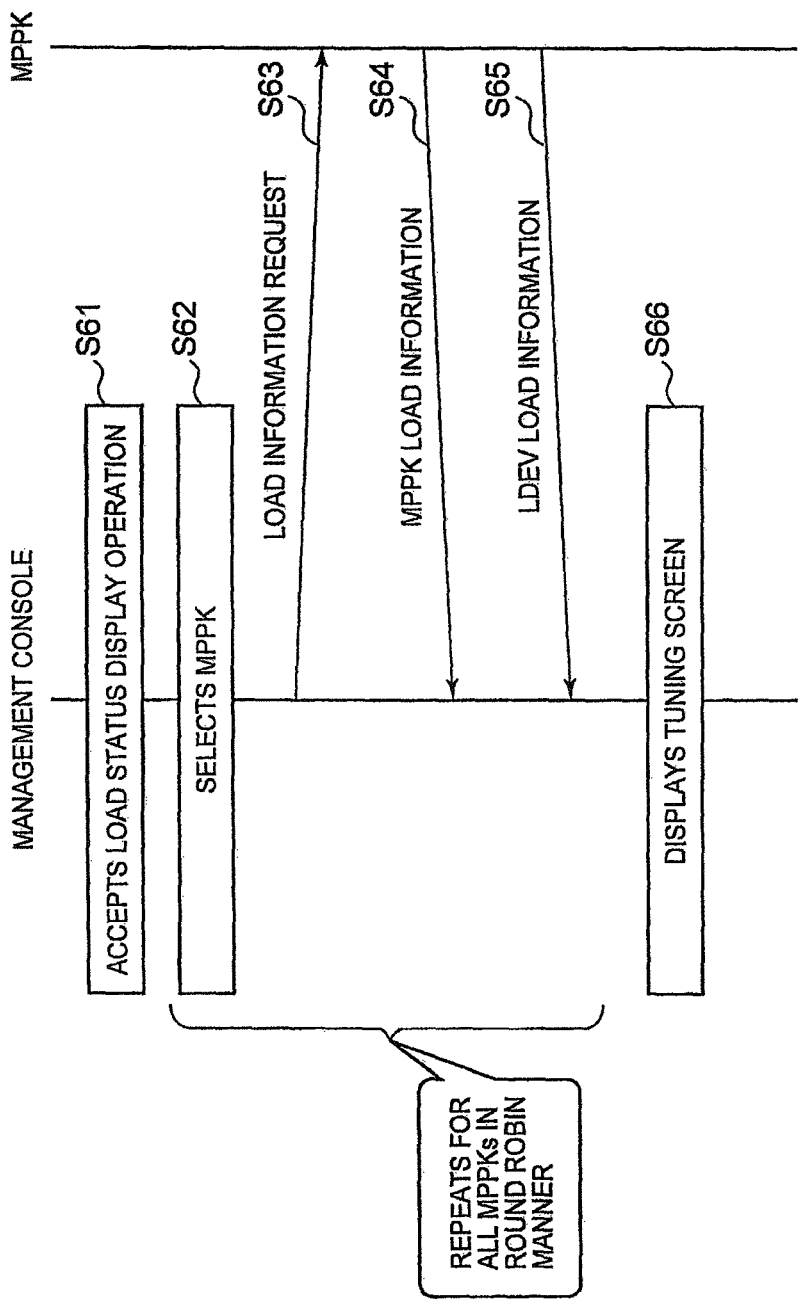
FIG. 13 is a flow chart depicting tuning screen display processing according to an embodiment of the present invention.

FIG. 13 is a flow chart depicting the tuning screen display processing according to the embodiment of the present invention.

In the tuning screen display processing, the CPU 26 of the management console 20 accepts a load status display instruction by the operation of the user via the input unit 28 (step S61). When the load status display instruction is accepted, the CPU 26 executes the following processing steps (step S62 to step S65) for all the MPPKs 120 of the storage system 10.

First the CPU 26 selects one MPPK 120 out of the plurality of MPPKs 120 of the storage system 10 according to round robin (step S62).

Then the CPU 26 transmits a load information request to the selected MPPK 120 (step S63).

The MP 121 of the MPPK 120 which received the load information request extracts the load information of the MPPK from the MPPK load information 124*e* of the LM 122, and transmits it to the management console 20 (step S64), extracts the load information of each LDEV from the LDEV load information 124*d* of each LDEV of the LM 122, and transmits each load information to the management console 20 along with each LDEV number (step S65). The management console 20, on the other hand, receives the MPPK load information which is transmitted from the MPPK 120, and the load information of the LDEV and the LDEV number.

If the load information of MPPK and the load information of LDEV are received from all the MPPKs 120, the CPU 26 of the management console 20 displays the tuning screen 60 shown in FIG. 8 on the display unit 29 based on each information received (step S66).

Now the tuning processing for shifting an MPPK 120, which is in-charge of an LDEV, to another MPPK 120 will be described.

Figure 14:
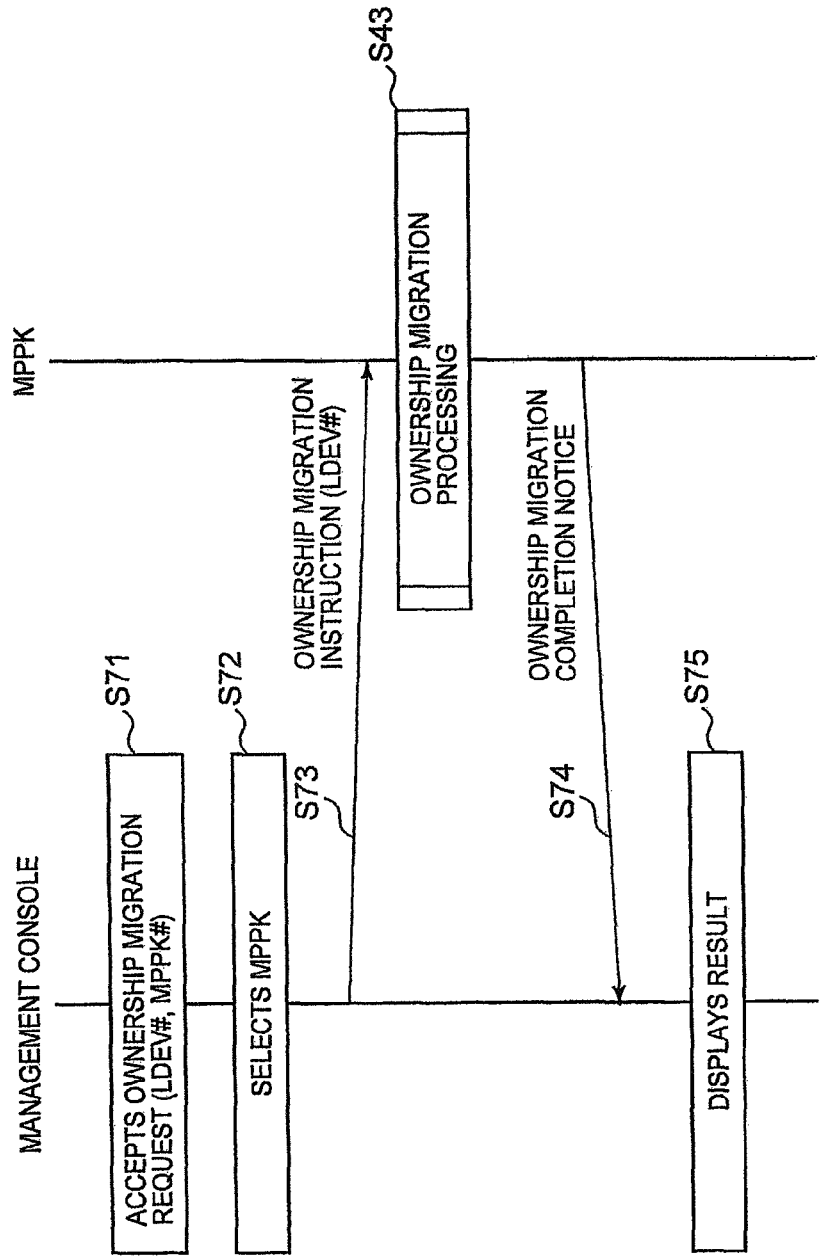
FIG. 14 is a flow chart depicting tuning processing according to an embodiment of the present invention.

FIG. 14 is a flow chart depicting the tuning processing according to the embodiment of the present invention.

In the turning processing, the CPU 26 of the management console 20 accepts a specification of the LDEV of which charge is to be changed, and a specification of a new MPPK which is to be in-charge of the LDEV by the operation of the user via the input unit 28 (step S71). According to the present embodiment, the CPU 26 accepts the specification of the LDEV of which charge is to be changed and the specification of the new MPPK 120 which is to be in-charge of the LDEV by the operation of the user via the input unit 28 when the tuning screen 60 is being displayed, for example.

Then the CPU 26 selects the MPPK 120 specified by the user as the MPPK 120 at the transmission destination (step S72). Then the CPU 26 transmits an ownership migration instruction including an LDEV number corresponding to the specified LDEV to the selected MPPK 120 via the communication I/F 21 and the internal network 150 (step S73).

The MP 121 of the MPPK 120 at the transmission destination receives the ownership migration instruction via the internal network 150. Then the MP 121 obtains the ownership of the migration target LDEV by executing the ownership migration processing (step S43). This enables the MP 121 of this MPPK 120 to execute the input/output processing for this LDEV.

Then the MP 121 transmits an ownership migration completion notice to the management console 20 (step S74). The CPU 26 of the management console 20, which received the ownership migration completion notice, displays the result to indicate completion of the shift of the ownership of this LDEV on the display unit 29 (step S75).

According to this tuning processing, the ownership of the LDEV which has been used can easily be shifted to another MPPK 120. Therefore the load of an MPPK 120 in the storage system 10 can be easily and appropriately balanced.

In the storage system 10, if a failure occurred to one of the host I/F unit 100, MPPK 120, shared memory unit 130, disk I/F unit 140 and HDD 170, the failed unit is removed and a new unit or repaired unit is installed, that is replacement, is performed. The processing in the storage system 10 when such a replacement is performed will be described below.

First the MPPK replacement processing when an MPPK 120 is replaced will be described.

Figure 15:
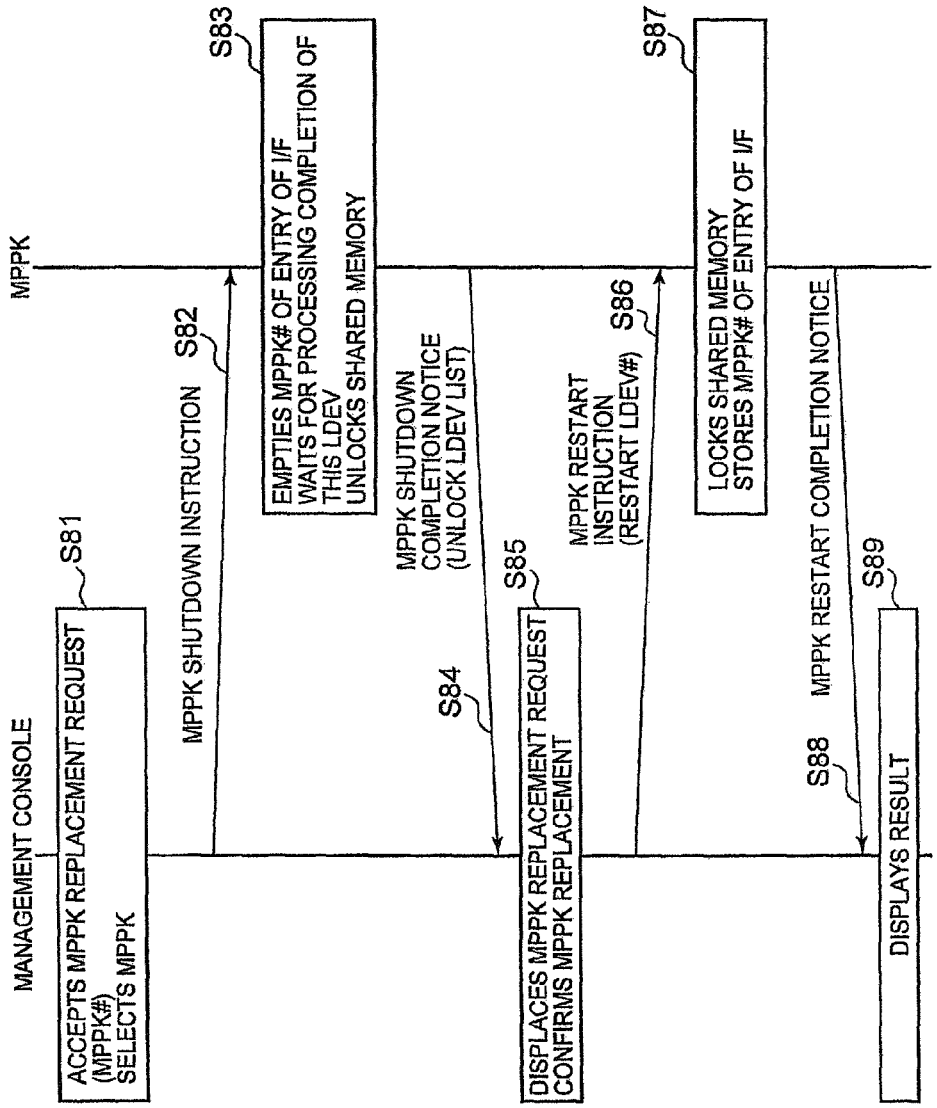
FIG. 15 is a flow chart depicting MPPK replacement processing according to an embodiment of the present invention.

FIG. 15 is a flow chart depicting the MPPK replacement processing according to the embodiment of the present invention.

In the MPPK replacement processing, the CPU 26 of the management console 20 accepts the input of the MPPK number to be replaced by the operation of the user via the input unit 28. Then the CPU 26 selects the MPPK 120 corresponding to the MPPK number as the MPPK 120 at the transmission destination (step S81).

Then the CPU 26 transmits an MPPK shutdown instruction to the selected MPPK 120 via the communication I/F 21 and the internal network 150 (step S82).

The MP 121 of the MPPK 120 at the transmission destination receives the MPPK shutdown instruction via the internal network 150. Then the MP 121 refers to the with/without lock 124*a* stored in the LM 122, and specifies the LDEV number of the LDEV of which ownership is held by the local MPPK 120 to which this MP 121 belongs. The MP 121 executes the following processing step (step S83) for each LDEV having each LDEV number as a processing target.

The MP 121 acquires the I/F number and the path name corresponding to the processing target LDEV number from the LM 122. Then the MP 121 sets the MPPK number in the entry including the path name to null (e.g. −1) in the management table 102 of the host I/F 101 corresponding to this I/F number. By this, a new input/output request for the target LDEV from the host I/F 101 being transferred to this MPPK 120 can be prevented.

Then the MP 121 waits until the input/output processing for this LDEV is completed. Completion of the input/output processing for the LDEV can be known by the absence of an input/output request for the target LDEV in the queue stored in the LM 122 of this MPPK 120. This can prevent a status where an already accepted input/output processing for the LDEV cannot be executed.

Then the MP 121 unlocks the control information of this LDEV in the shared memory 131, that is stores the null value (e.g. −1) in the lock word 134a of the corresponding LDEV (step S83).

If the processing for all the LDEVs of which ownership is held by MPPK 120 ends, the MP 121 transmits an MPPK shutdown completion notice to indicate that the closing of the MPPK is completed and replacement is possible to the management console 20, along with the list of LDEV numbers of unlocked LDEVs (LDEVs of which ownership is held by the MPPK) (unlocked LDEV list) (step S84).

The CPU 26 of the management console 20 which received the MPPK shutdown completion notice causes the display unit 29 to display the content of the replacement of the MPPK 120 that is requested, and performs processing to confirm whether the replacement of the MPPK 120 is completed (step S85). Whether the MPPK 120 has been replaced or not can be known by the CPU 26 communicating with the MPPK 120.

If the CPU 26 of the management console 20 confirmed replacement of the MPPK 120, the CPU 26 transmits an MPPK restart instruction, including the LDEV number included in the unlocked LDEV list, to the replaced MPPK 120 (step S86).

The MP 121 of the MPPK 120 which received the MPPK restart instruction executes the following processing step (step S87) for all the LDEVs having the LDEV numbers included in the MPPK restart instruction as processing targets. In other words, the MP 121 locks the control information for the processing target LDEV in the shared memory 131, that is stores the local MPPK number of this MP 121 in the lock word 134a of the target LDEV. Then the MP 121 acquires the LDEV individual control information 134 of the target LDEV from the shared memory 131 and copies it to the LM 122. The MP 121 acquires the entry having the LDEV number of the target LDEV from the LDEV number correspondence table 132 of the shared memory 131 and stores it to the LM 122. The MP 121 also sets the with/without lock 124a corresponding to the target LDEV in the LM 122 to with lock, and sets a pointer pointing the beginning of the LDEV individual control information 124c in the LM 122 to the pointer 124b. Also the MP 121 acquires the I/F number and the path name corresponding to the LDEV number of the target LDEV from the LDEV number management table 132 in the LM 122. Then the MP 121 stores the local MPPK number in the MPPK number of the entry which includes this path name in the management table 102 of the host I/F 101 corresponding to this I/F number (step S87).

If the processing for all the processing target LDEVs is completed, the MP 121 transmits an MPPK restart completion notice to indicate the restart of the MPPK to the management console 20 (step S88).

The CPU 26 of the management console 20 which received the MPPK restart completion notice displays the result to indicate completion of the restart of MPPK on the display unit 29 (step S89). According to this MPPK replacement processing, the MPPK 120 after replacement can hold the ownership of the LDEV held by the MPPK 120 before replacement, and the input/output processing for the owned LDEV can be executed by the MPPK 120 after replacement in the same way as the MPPK 120 before replacement.

Now the I/F PK replacement processing for replacing the host I/F unit will be described.

Figure 16:
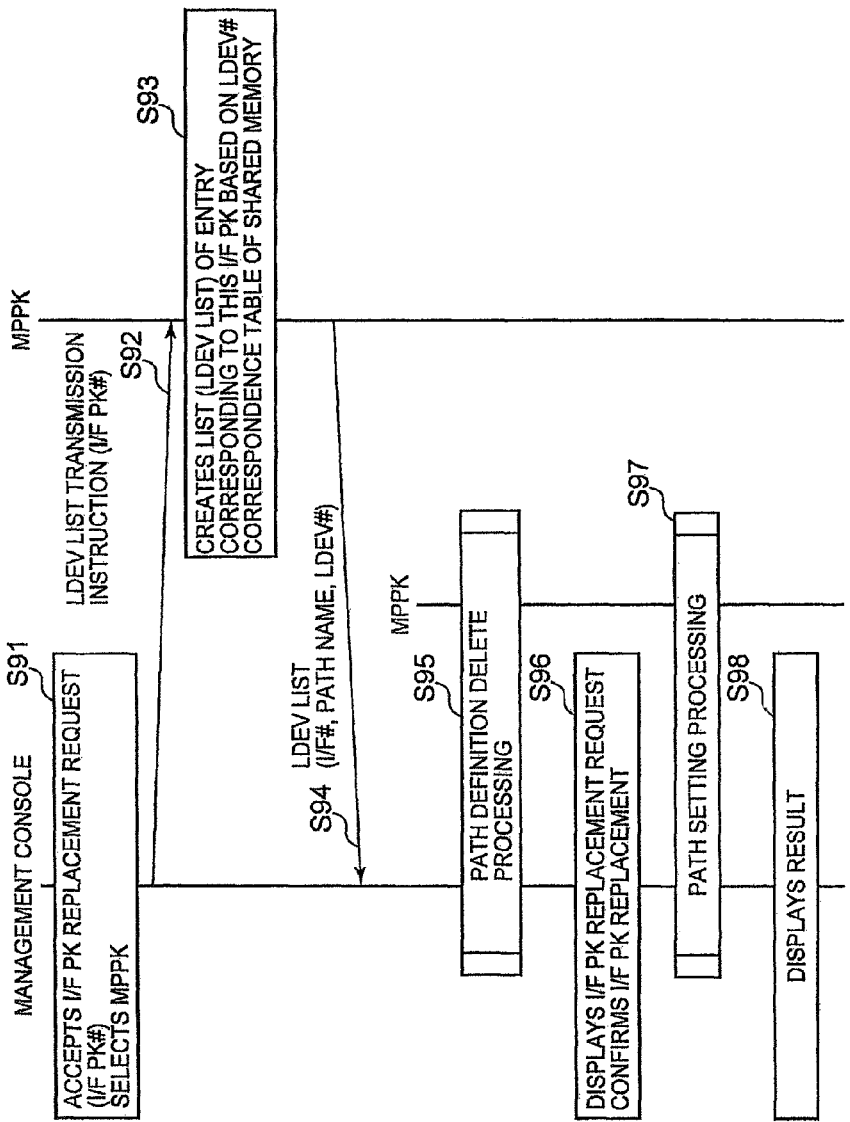
FIG. 16 is a flow chart depicting I/FPK replacement processing according to an embodiment of the present invention.

FIG. 16 is a flow chart depicting an I/F PK replacement processing according to the embodiment of the present invention.

In the I/F PK replacement processing, the CPU 26 of the management console 20 accepts the input of the I/F PK number of the host I/F unit 100 to be replaced, by the operation of the user via the input unit 28. Then the CPU 26 selects an arbitrary MPPK 120 from the plurality of MPPKs 120 (step S91).

Then the CPU 26 transmits an LDEV list transmission instruction, including the accepted I/F PK number, to the selected MPPK 120 via the communication I/F 21 and the internal network 150 (step S92).

The MP 121 of the MPPK 120 at the transmission destination receives the LDEV list transmission instruction via the internal network 150. Then the MP 121 extracts an entry, which is storing the I/F number of the host I/F 101 belonging to the host I/F unit 100 corresponding to the I/F PK number included in the LDEV list transmission instruction, from the LDEV number correspondence table 132 stored in the shared memory 131, and creates an LDEV list including the extracted entry (step S93). If the I/F PK number is included in the I/F number, for example, the I/F number of the host I/F 101 belonging to the host I/F unit 100 corresponding to the I/F PK number can be specified by the included I/F PK number. Also a table, where the I/F PK number and the I/F number of the host I/F belonging to the host I/F unit corresponding to this I/F number are corresponded, may be provided in the shared memory 130 in advance, so as to specify the I/F number from the I/F PK number using this table.

Now the MP 121 transmits the created LDEV list to the management console 20 (step S94).

The CPU 26 of the management console 20 which received the LDEV list starts execution of a later mentioned path definition delete processing (step S95) targeting all the LDEVs in the LDEV list. By this, the paths to all the LDEVs from the replacement target host I/F unit 100 via the host I/F 101 are deleted.

After deletion of the paths is completed, the CPU 26 of the management console 20 displays the request content to replace the host I/F unit 100 on the display unit 29, and executes processing to confirm whether the replacement of the host I/F unit 100 is completed (step S96). Whether the host I/F unit 100 has been replaced or not can be known by the CPU 26 communicating with the host I/F unit 100.

If the CPU 26 of the management console 20 confirms the replacement of the host I/F unit 100, the CPU 26 starts execution of the path setting processing (step S97) shown in FIG. 10 for all the LDEVs in the LDEV list. By this, paths the same as the host I/F unit 100 before replacement can be set and the same status as before replacement can be reproduced using the newly replaced host I/F unit 100. After setting of the paths is completed, the CPU 26 of the management console 20 displays the result to indicate completion of the restart of the host I/F unit 100 on the display unit 29 (step S98).

Now path definition delete processing (step S95) will be described.

Figure 17:
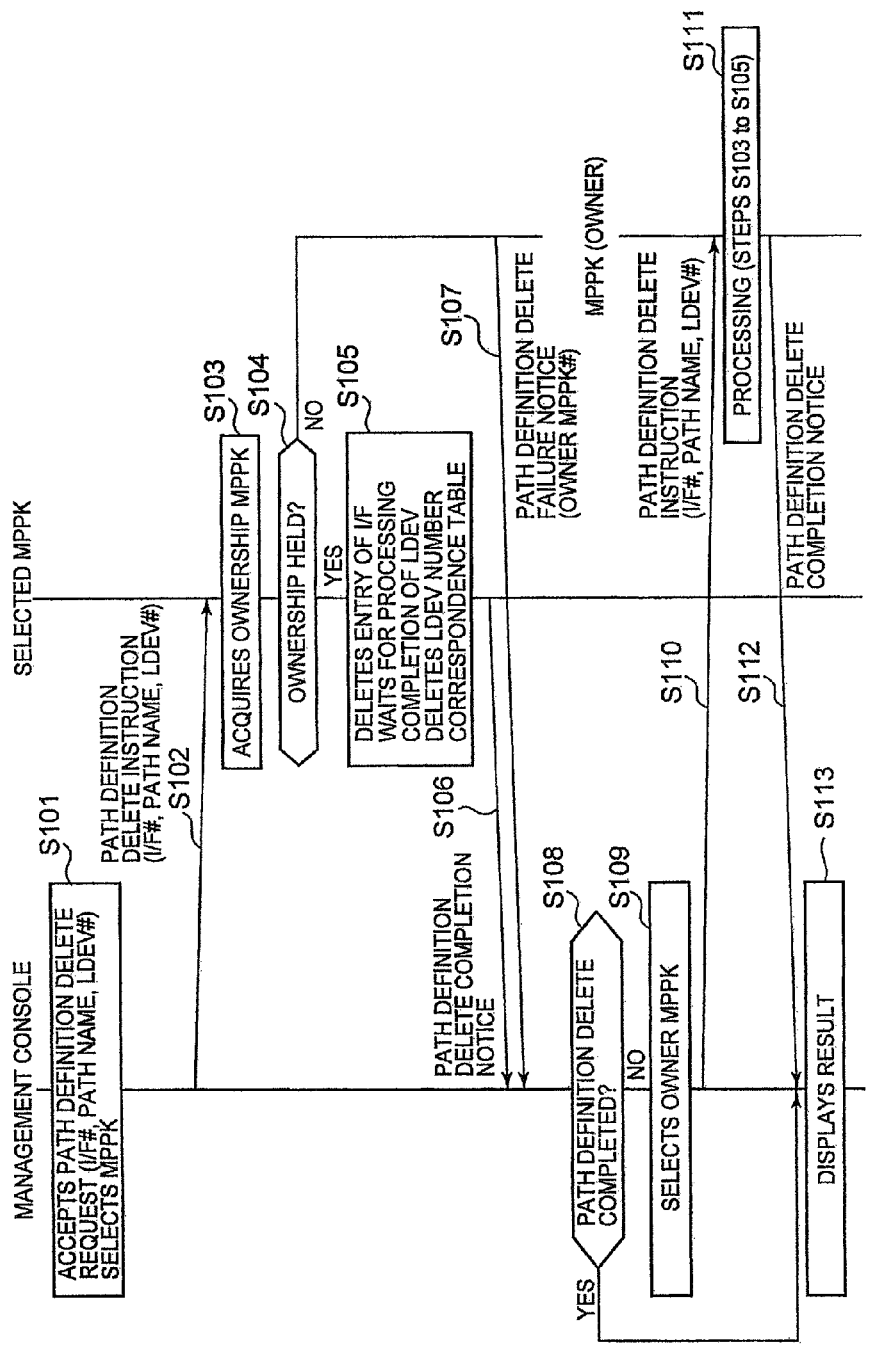
FIG. 17 is a flow chart depicting path definition delete processing according to an embodiment of the present invention.

FIG. 17 is a flow chart depicting the path definition delete processing according to the embodiment of the present invention.

In the path definition delete processing, the CPU 26 of the management console 20 accepts a path definition delete request. According to the present embodiment, the CPU 26 accepts the entry of the LDEV list (I/F number, path name and LDEV number) transmitted from the MPPK 120 as the path definition delete request. Then the CPU 26 selects an MPPK 120 to be the transmission destination of the path definition delete instruction from the plurality of MPPKs 120 (step S101). The CPU 26 may select the MPPK 120 in round-robin manner or may select it at random.

Then the CPU 26 transmits the path definition delete instruction including the I/F number, path name and LDEV number to the selected MPPK 120 via the communication I/F 21 and the internal network 150 (step S102).

The MP 121 of the MPPK 120 at the transmission destination receives the path definition delete instruction via the internal network 150. Then the MP 121 acquires the MPPK number of the MPPK 120 which has ownership of the LDEV having the LDEV number included in the path definition delete instruction from the shared memory 131 (step S103). The MPPK number of the MPPK 120 which has the ownership can be acquired from the lock word 134a of the corresponding LDEV in the shared memory 131.

Then the MP 121 judges whether the local MPPK 120 to which this MP 121 belongs has ownership of the path definition delete target LDEV based on whether the acquired MPPK number is the MPPK number of the local MPPK 120 (step S104).

If the acquired MPPK number matches the MPPK number of the local MPPK 120, that is the local MPPK 120 has ownership of the path definition delete target LDEV (YES in step S104), the MP 121 acquires the I/F number and the path name corresponding to the LDEV number included in the path definition delete instruction from the LDEV number correspondence table 132 stored in the LM 122. Then the MP 121 deletes the entry including this path name from the management table 102 of the host I/F 101 corresponding to this I/F number. Then the MP 121 waits until the input/output processing for this LDEV is completed. Completion of the input/output processing for an LDEV can be known by the absence of an input/output request for the target LDEV in the queue stored in the LM 122 of this MPPK 120. This can prevent a status where an already accepted input/output processing for the LDEV cannot be executed. Then the MP 121 deletes the entry corresponding to this LDEV number from the LDEV number correspondence table 132 of the LM 122 and the shared memory 131 (step S105). Then the MP 121 transmits a path definition delete completion notice to the management console 20 (step S106).

On the other hand, if the acquired MPPK number does not match the MPPK number of the local MPPK 120, that is the local MPPK 120 does not have ownership of the path definition delete target LDEV (NO in step S104), the information on this LDEV cannot be updated, so a path definition delete failure notice, including the acquired MPPK number of the MPPK 120 which has ownership, is transmitted to the management console 20 (step S107).

The CPU 26 of the management console 20 judges whether the path definition delete is completed, that is whether the path definition delete completion notice has been received (step S108), and if the path definition delete completion notice has been received, the CPU 26 displays the result to indicate the path definition delete completion on the display unit 29 (step S113).

On the other hand, if the path definition delete is not completed, that is if the path definition delete failure notice has been received (NO in step S108), the CPU 26 selects the MPPK 120 having the MPPK number included in the path definition delete failure notice as a transmission definition (step S109), and transmits the path definition delete instruction including the I/F number, path name and LDEV number to this MPPK 120 (step S110).

The MP 121 of the MPPK 120 which received the path definition delete instruction executes the processing in step S103 to step S105 (step S111). Here this MPPK 120 has ownership, so the processing corresponding to step S105 is executed in step S111. Then the MP 121 transmits the path definition delete completion notice to the management console 20 (step S112). Then the CPU 26 of the management console 20 which received the path definition delete completion notice displays the result to indicate completion of path definition delete on the display unit 29 (step S113).

According to the above mentioned path definition delete processing, even if the MPPK 120 selected as a destination to transmit the path definition delete instruction does not have ownership of the corresponding LDEV, the path definition delete instruction can be transmitted to the MPPK 120 having ownership of the corresponding LDEV so as to delete the path definition. Therefore the management console 20 need not know the MPPK having ownership of the LDEV. As a consequence, even if the storage system 10 shifted ownership of the LDEV independently from the management console 20, the path definition can be deleted without problems.

Now an access securing processing to enable the input/output processing for the LDEV of which ownership is held by an MPPK 120, when this MPPK 120 is being replaced or is in failure status, will be described.

Figure 18:
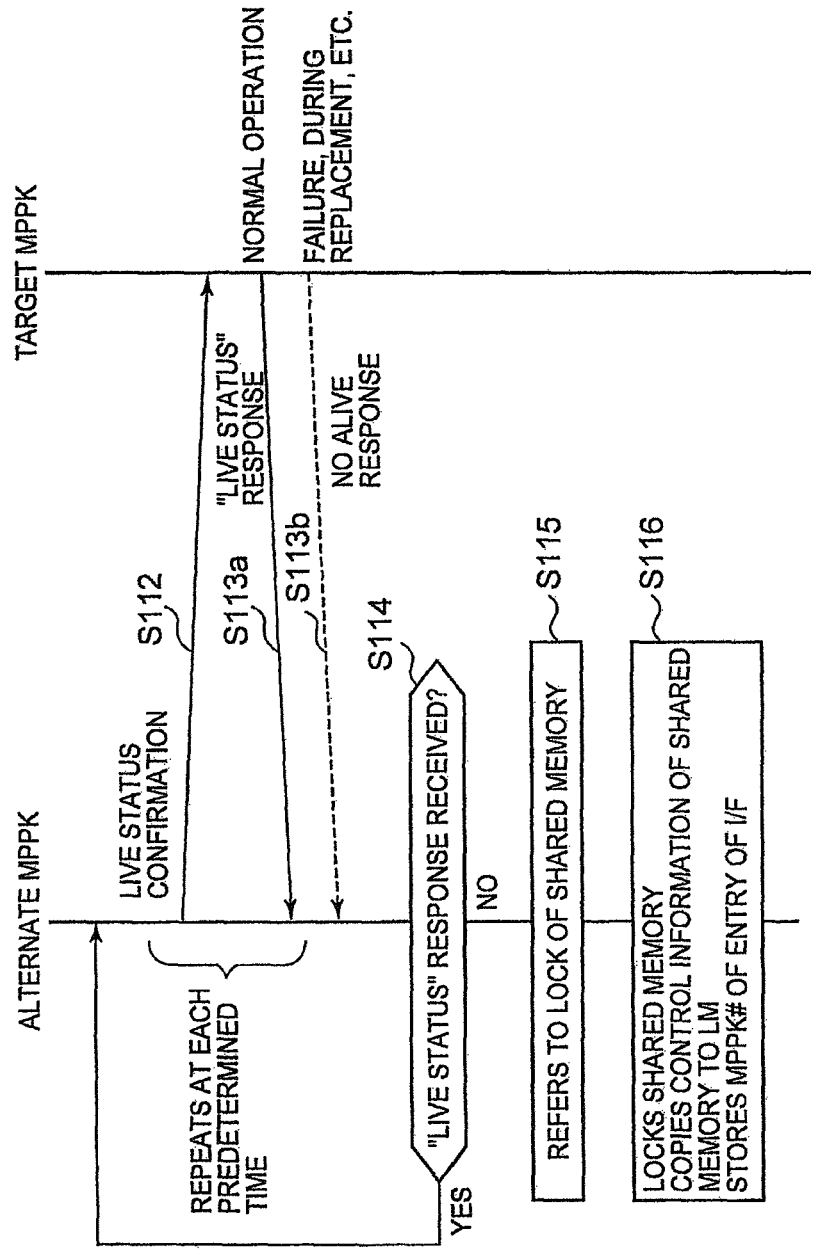
FIG. 18 is a flow chart depicting access securing processing according to an embodiment of the present invention.

FIG. 18 is a flow chart depicting the access securing processing according to the embodiment of the present invention.

According to the present embodiment, MPPKs 120 to form a pair are predetermined in the plurality of MPPKs 120, so that one MPPK 120 executes the input/output processing for the LDEV of which the other MPPK 120 of the pair is in-charge during replacement.

In the access securing processing, one MPPK 120 (called an alternate MPPK) confirms the live status of the other MPPK 120 of the pair (called the target MPPK) whether the target MPPK is alive (step S112). If the target MPPK 120 is operating, the target MPPK 120 transmits the alive response (step S113a). On the other hand, if the target MPPK 120 is being replaced or is in failure status, the target MPPK 120 cannot transmit the alive response (step S113b).

In the alternate MPPK 120, the MP 121 judges whether the alive response to the live status confirmation is received from the target MPPK 120 (step S114), and if the alive response is received (YES in step S114), it is unnecessary to replace the processing being performed by the target MPPK 120, so the processing from step S112 is executed after a predetermined time elapses.

On the other hand, if the alive response is not received (NO in step S114), this means that the target MPPK 120 cannot perform the input/output processing for the LDEV of which the target MPPK 120 is in-charge, so the MP 121 of the alternate MPPK 120 refers to the LDEVs locked by the target MPPK 120 in the shared memory 131. In other words, the MP 121 specifies all the LDEVs for which the target MPPK 120 holds ownership (step S115).

Then the MP 121 executes the following processing for all the specified LDEVs. First the MP 121 locks the control information of the target LDEV in the shared memory 131, that is MP 121 stores the local MPPK number to the lock word 134a of the corresponding LDEV. Then the MP 121 acquires the LDEV individual control information 134 of the target LDEV from the shared memory 131 and copies it to the LM 122. By this, the LDEV individual control information 124c of the corresponding LDEV exists in the LM 122. The MP 121 also acquires the entry having the LDEV number of the target LDEV from the LDEV number correspondence table 132 of the shared memory 131, and stores it in the LM 122. The MP 121 also sets the with/without lock 124a corresponding to the target LDEV of the LM 122 to with lock, and sets the pointer pointing the beginning of the LDEV individual control information 124c of the LM 122 to the pointer 124b. The MP 121 also acquires the I/F number and the path name corresponding to the LDEV number of the target LDEV from the LDEV number management table 132 of the LM 122. Then the MP 121 stores the local MPPK number of the MP 121 to the MPPK number of the entry including this path name in the management table 102 of the host I/F 101 corresponding to this I/F number (step S116). By this, the alternate MPPK 120 can secure ownership of the target LDEV, and can execute the input/output processing for the target LDEV instead of the target MPPK 120.

Now the first modified example of the embodiment of the present invention will be described.

In the above embodiments, a following LDEV elimination processing may be executed instead of the LDEV elimination processing shown in FIG. 11.

Figure 19:
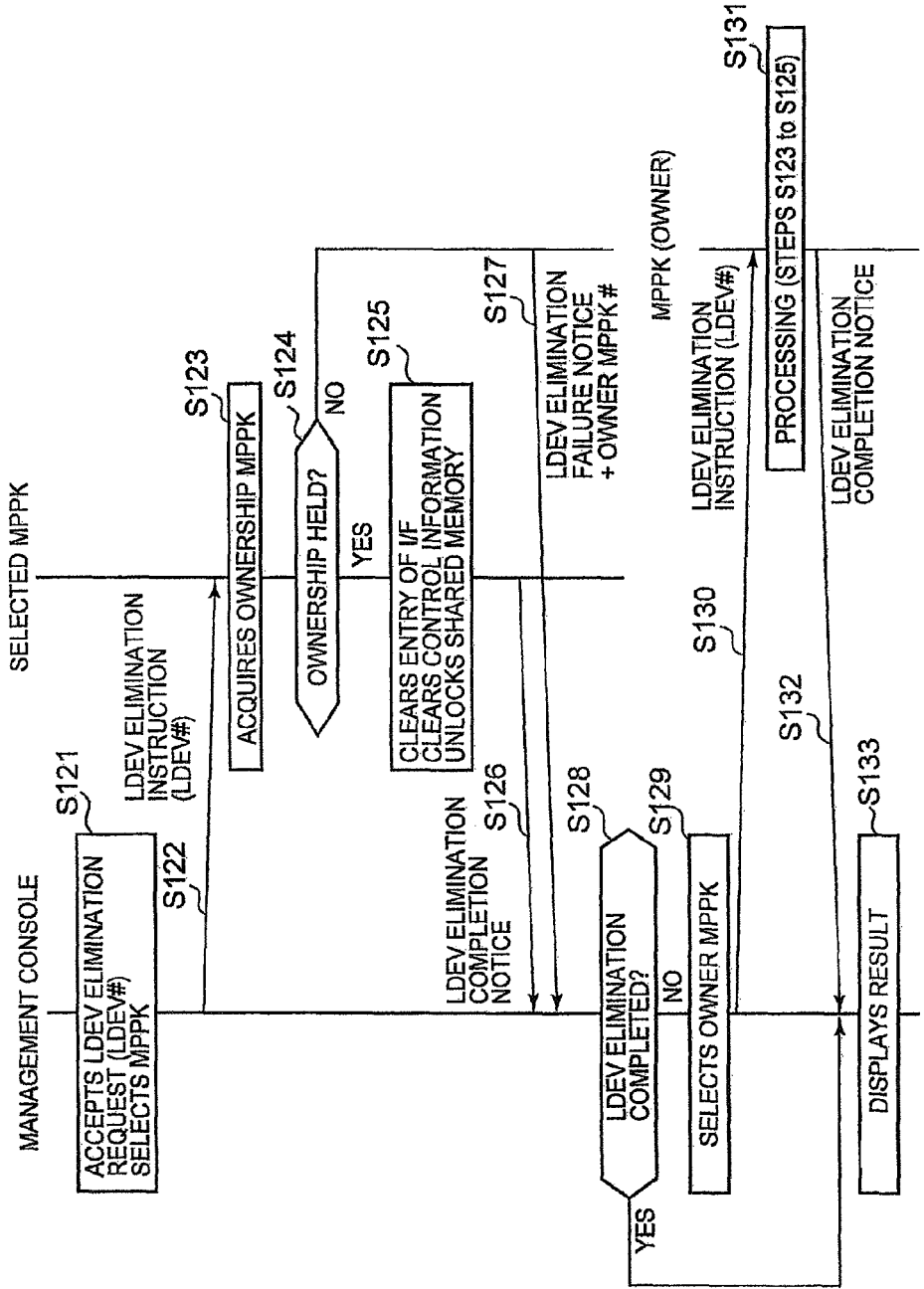
FIG. 19 is a flow chart depicting LDEV elimination processing according to a first modified example of an embodiment of the present invention.

FIG. 19 is a flow chart depicting the LDEV elimination processing according to the first modified example of the embodiment of the present invention.

In the LDEV elimination processing according to a modified example, the CPU 26 of the management console 20 accepts the LDEV elimination request by the operation of the user via the input unit 28. In the present embodiment, the CPU 26 accepts the specification of the LDEV to be eliminated and knows the LDEV number of the corresponding LDEV by the operation of the user via the input unit 28 while the LDEV management screen 51 is being displayed. Then the CPU 26 selects the MPPK 120 to be the transmission destination of the LDEV elimination instruction out of the plurality of MPPKs 120 (step S121). The CPU 26 may select the MPPK 120 in round-robin manner or may select it at random.

Then the CPU 26 transmits the LDEV elimination instruction including the accepted LDEV number to the selected MPPK 120 via the communication I/F 21 and the internal network 150 (step S122).

The MP 121 of the MPPK 120 at the transmission destination receives the LDEV elimination instruction via the internal network 150. Then the MP 121 acquires the MPPK number of the MPPK 120 which has ownership of the LDEV having the LDEV number included in the LDEV elimination instruction from the shared memory 131 (step S123). The MPPK number of the MPPK 120 having the ownership can be acquired from the lock word 134a of the corresponding LDEV in the shared memory 131.

Then the MP 121 judges whether the local MPPK 120 to which this MP 121 belongs has ownership of the elimination target LDEV, based on whether the acquired MPPK number is the MPPK number of the local MPPK 120 (step S124).

If the acquired MPPK number matches the MPPK number of the local MPPK 120, that is the local MPPK 120 has ownership of the elimination target LDEV (YES in step S124), the MP 121 acquires the I/F number and the path name corresponding to the LDEV number of the elimination target LDEV from the LDEV correspondence table 132 stored in the LM 122, and deletes the entry including this path name from the management table 102 of the host I/F 101 corresponding to this I/F number. The MP 121 also deletes the LDEV individual control information 124c and the LDEV load information 124d for the elimination target LDEV from the LM 122, sets the with/without lock 124a corresponding to this LDEV to without lock, and sets the pointer 124b to null.

The MP 121 also deletes the LDEV individual control information 134b for the corresponding LDEV from the shared memory 131, and unlocks the control information for the LDEV in the shared memory 131, that is stores the null value (e.g. −1) to the lock word 134a of the corresponding LDEV (step S125), then the MP 121 transmits an LDEV elimination completion notice to the management console 20 (step S126).

On the other hand, if the acquired MPPK number does not match the MPPK number of the local MPPK 120, that is the local MPPK 120 does not have ownership of the elimination target LDEV (NO in step S124), the information on this LDEV cannot be updated. Therefore the MP 121 includes the MPPK number of the acquired MPPK 120 having ownership in an LDEV elimination failure notice, and transmits it to the management console 20 (step S127).

The CPU 26 of the management console 20 judges whether elimination of the LDEV is completed, that is whether the LDEV elimination completion notice has been received (step S128), and if the LDEV elimination completion notice has been received, the CPU 26 displays the result to indicate the completion of LDEV elimination on the display unit 29 (step S133).

On the other hand, if the elimination of LDEV is not completed, that is if the LDEV elimination failure notice is received, the CPU 26 selects the MPPK 120 having the MPPK number included in the LDEV elimination failure notice as the transmission destination (step S129), and transmits the LDEV elimination instruction including the LDEV number to this MPPK 120 (step S130).

The MP 121 of the MPPK 120 which received the LDEV elimination instruction executes the processing in step S123 to step S125 (step S131). Since this MPPK 120 has ownership, the processing corresponding to step S125 is executed in step S131. Then the MP 121 transmits the LDEV elimination completion notice to the management console 20 (step S132). Then the CPU 26 of the management console 20 which received the LDEV elimination completion notice displays the result to indicate the completion of LDEV elimination on the display unit 29 (step S133).

According to the above mentioned LDEV elimination processing, even if the MPPK 120 selected as the destination to transmit the LDEV elimination instruction does not have ownership of the corresponding LDEV, the LDEV elimination instruction can be transmitted to the MPPK 120 having ownership of the corresponding LDEV so as to eliminate the LDEV. Therefore the management console 20 need not know the MPPK having ownership of the LDEV. As a consequence, even if the storage system 10 shifted the ownership of the LDEV independently from the management console 20, the LDEV can be eliminated without problems. As the MP 121 which received the LDEV elimination instruction need not perform the ownership migration processing for securing the ownership from another MPPK 120, as shown in FIG. 11, load on the MP 121 can be decreased.

Now the second modified example of an embodiment of the present invention will be described.

Figure 20:
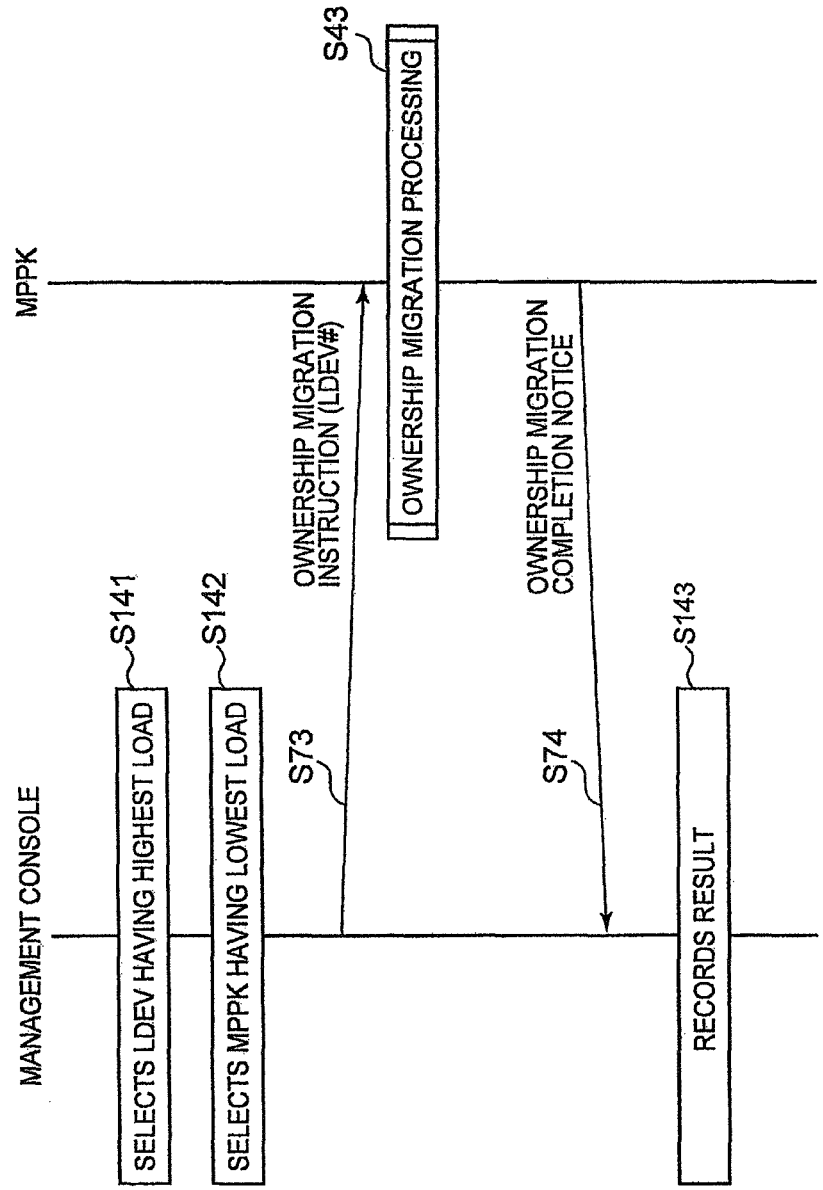
FIG. 20 is a flow chart depicting tuning processing according to a second modified example of an embodiment of the present invention.

FIG. 20 is a flow chart depicting the tuning processing according to the second modified example of the embodiment of the present invention.

According to the above embodiment, in the tuning processing in FIG. 14, the administrator sets the LDEV of which charge is to be changed and the MPPK in-charge of this LDEV, but according to the second modified example, the management console 20 automatically determines the LDEV of which charge is to be changed and the MPPK 120 in-charge of this LDEV based on the load of each MPPK 120 and the load of the LDEV. The same processing steps as FIG. 14 are denoted with the same reference numerals, of which redundant description is omitted.

In the tuning processing according to the second modified example, the CPU 26 of the management console 20 selects an LDEV having the highest load as the LDEV of which charge is to be changed, based on the load of the each MPPK 120 and the load of each LDEV which have been collected in advance (step S141), and selects an MPPK 120 of which load is lowest as the MPPK 120 which is to be in-charge (step S142). Then the CPU 26 of the management console 20 transmits an ownership migration instruction including the LDEV number corresponding to the selected LDEV to the selected MPPK 120 via the communication I/F 21 and the internal network 150 (step S73).

Then the CPU 26 of the management console 20 receives the ownership migration completion notice and records the content on the executed shift of LDEV ownership in a log area of the HDD 25 (step S143).

According to the above mentioned tuning processing, the ownership of the LDEV which has the highest load can be shifted to the MPPK 120 which has the lowest load, so that the load of the MPPK 120 can be balanced without operation of the administrator.

Now the third modified example of the embodiment of the present invention will be described.

Figure 21:
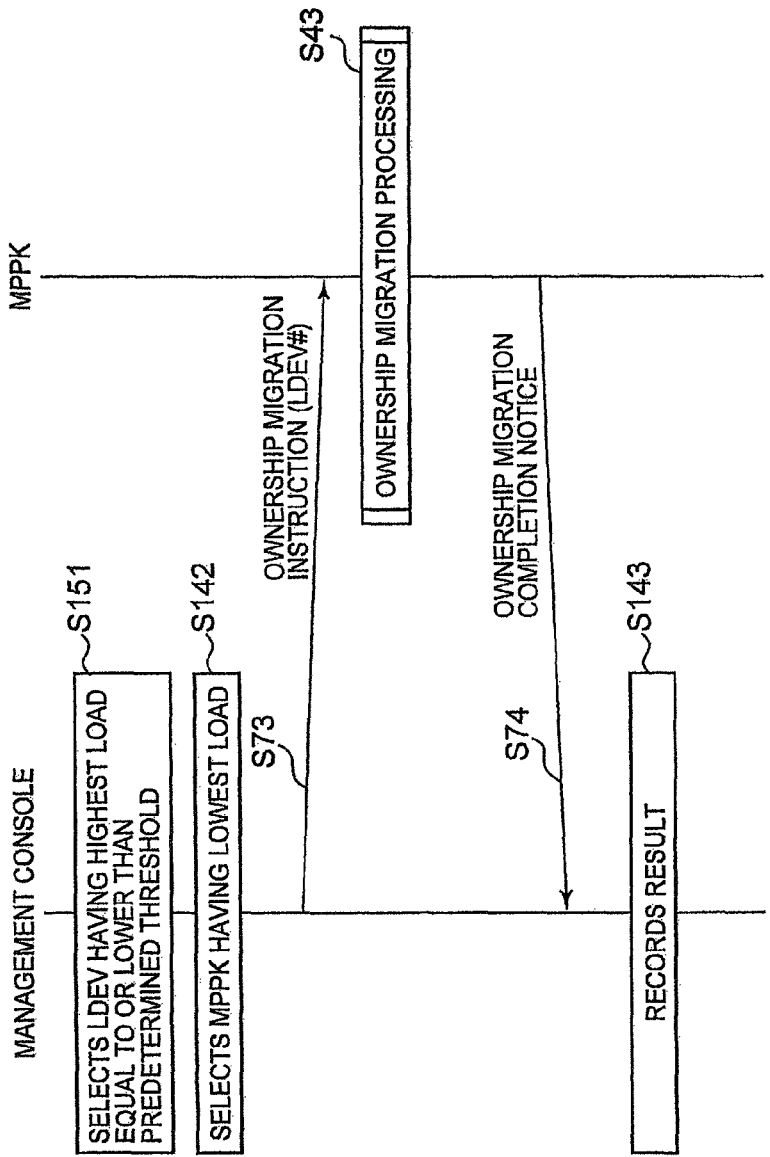
FIG. 21 is a flow chart depicting tuning processing according to a third modified example of an embodiment of the present invention.

FIG. 21 is a flow chart depicting the tuning processing according to the third modified example of the embodiment of the present invention.

The third modified example is the above mentioned second modified example where the method for selecting the LDEV of which charge is to be changed is different. The same processing steps in FIG. 14 and FIG. 20 are denoted with the same reference numerals, of which redundant description is omitted.

In the tuning processing according to the third modified example, the CPU 26 of the management console 20 selects an LDEV having the highest load equal to or lower than a predetermined threshold as the LDEV of which charge is to be changed, based on the load of each LDEV collected in advance (step S151), and performs subsequent processing. By this, the MPPK 120 in-charge of the LDEV having the highest load can be changed even if the load is equal to or lower than the predetermined threshold.

According to the above mentioned tuning processing, the LDEV having the highest load is selected as the LDEV of which charge is to be changed out of the LDEVs of which loads are less than the predetermined threshold, so the load of the MPPK 120 can be balanced while maintaining stability.

Now the fourth modified example of an embodiment of the present invention will be described.

FIG. 22 is a flow chart depicting an automatic load balancing adjustment processing according to the fourth modified example of an embodiment of the present invention.

In the above embodiment, the CPU 26 of the management console 20 requests the load information to the MPPK 120 and collects additional information from the MPPK 120, as shown in FIG. 13, but according to the fourth modified example, the MPPK 120 voluntarily transmits the MPPK load information and the LDEV load information to the management console 20, and based on the LDEV load information and the MPPK load information transmitted from the MPPK 120, the management console 20 performs processing similar to FIG. 21. The same processing steps in FIG. 13 and FIG. 21 are denoted with the same reference numerals, of which redundant description is omitted.

The MP 121 of the MPPK 120 transmits the MPPK load information to the management console 20 at an arbitrary point of time (step S161), and transmits the LDEV load information to the management console 120 (step S162). The MP 121 of each MPPK 120 may transmit the MPPK load information and the LDEV load information to the management console 120 or one MPPK 120 may collect the MPPK load information and the LDEV load information from another MPPK 120 in advance, and transmit this to the management console 120 all at once.

Then the CPU 26 of the management console 20 starts the following processing based on the MPPK load information and the LDEV load information transmitted from the MPPK 120.

According to this processing, the load of the MPPK 120 can be balanced without operation of the administrator.

Embodiments of the present invention were described above, but the present invention is not limited to the above embodiments, but can be applied to various other modes.

For example, in each of the above embodiments, HDD was described as an example of a storage device, but the present invention is not limited to this, and at least a part or all HDDs may be replaced with other storage devices that can store data, such as a DVD drive, magnetic tape drive and flash memory device.

In the above embodiments, the LDEV creation setting and the path setting are executed at different timings, but the present invention is not limited to this, for the LDEV creation setting and the path setting may be executed at the same time. For example, information required for path setting (I/F#, path name) is accepted when the LDEV creation request is accepted (step S11), and an LDEV creation instruction is transmitted to the MP 121 of the MPPK 120 in-charge of the LDEV, along with the information required for path setting (step S12), and the MP 121 executes the processing for storing the RAID group configuration information and the LDEV number correspondence table (step S13, step S25). If the path setting is executed at the same time like this, the information required for the path setting can be transmitted directly to the MPPK 120 in-charge of an LDEV, so it is unnecessary to perform processing considering the case when this information is transmitted to an MPPK 120 which is not in-charge (e.g. S29 to S31). As a consequence, the processing load in path setting can be decreased, and time required for path setting can be decreased.

Also in the above embodiment, the CPU 26 of the management console 20 performs the load balancing processing, but the present invention is not limited to this, and the MP 121 of one MPPK 120 may execute processing executed by the CPU 26 of the management console 20, for example. In the above embodiment, an MPPK 120 having the lowest load is selected from all the MPPKs 120, but the present invention is not limited to this, and the MPPK 120 may be selected from a plurality of MPPKs 120 which the administrator specified in advance, for example.

In the above embodiments, the MPPK 120 has a plurality of MPs 121, but the present invention is not limited to this, and the MPPK 120 may have one MP 121, for example.

In the above embodiments, one of the MPPKs 120 forming a pair secures the access right to the LDEV of which the other MPPK is in-charge if this MPPK cannot operate, but the present invention is not limited to this, and each of a plurality of MPPKs 120 may secure the access right to the LDEV of which another MPPK 120 is in-charge when this MPPK 120 cannot operate, or an arbitrary MPPK 120 may secure the access right to the LDEV of which another arbitrary MPPK 120 is in-charge when this MPPK 120 cannot operate.

What is claimed is:

1. A storage system coupled to a host computer and a management computer, comprising:
   a plurality of storage devices that are provided as a plurality of logical storage devices to the host computer;
   an interface unit that is coupled to the management computer;
   a shared memory that stores control information for the plurality of logical storage devices, said control information including ownership information for the logical storage devices;
   a plurality of micro-processor packages, each of the plurality of micro-processor packages being associated with at least one micro-processor;
      wherein the interface unit comprises management information for managing the plurality of micro-processor packages that are in-charge of controlling input/output processing for the storage area of the logical storage devices, and
   a request transfer unit that transfers an input/output request to the micro-processor package that is in-charge of the input/output processing for the logical storage device based on the management information when the input/output request for the logical storage device is received from the host computer,
      wherein each of the plurality of micro-processor packages:
      (1) receives a request for changing ownership from a first micro-processor package, which is in charge of the logical storage device whose load is higher than other logical storage devices, to a second micro-processor package whose load is lower than other micro-processor packages,
      (2) sets the management information and the control information such that the second micro-processor package is in charge of a logical storage device which the first micro-processor package was in charge of, and
      (3) outputs a result of the changed ownership to the management computer.

2. The storage system as recited in claim 1, wherein the first microprocessor package is in charge of a logical storage device whose load is the highest.

3. The storage system as recited in claim 1, wherein the first microprocessor is in charge of a logical storage device whose load is highest among logical storage device s whose respective load is equal to or smaller than a predetermined threshold.

4. The storage system as recited in claim 1, wherein the logical storage device load information and the micro-processor package load information is collected from other micro-processor packages, and the ownership is changed by considering said information.

5. A method of administering a storage system, which is coupled to a host computer and a management computer, comprising (1) a plurality of storage devices provided as a plurality of logical storage devices to the host computer, (2) an interface unit that is coupled to the management computer, (3) a shared memory that stores control information for the plurality of logical storage devices, said control information including ownership information for the logical storage devices, (4) a plurality of micro-processor packages, each of the plurality of micro-processor packages being associated with at least one micro-processor, and (5) a request transfer unit that transfers an input/output request to the micro-processor package that is in-charge of input/output processing for the logical storage device based on the management information when the input/output request for the logical storage device is received from the host computer, wherein the interface unit comprises management information for managing the plurality of micro-processor packages that are in-charge of controlling input/output processing for the storage area of the logical storage devices, the method comprising, among the plurality of micro-processor packages:
   (a) receiving a request for changing ownership from a first micro-processor package, which is in charge of the logical storage device whose load is higher than other logical storage devices, to a second micro-processor package whose load is lower than other micro-processor packages,
   (b) setting the management information and the control information such that the second micro-processor package is in charge of a logical storage device which the first micro-processor package was in charge of, and
   (c) outputting a result of the changed ownership to the management computer.

6. The method of administering a storage system as recited in claim 5, wherein the first microprocessor package is in charge of a logical storage device whose load is the highest.

7. The method of administering a storage system as recited in claim 5, wherein the first microprocessor is in charge of a logical storage device whose load is highest among logical storage device whose respective load is equal to or smaller than a predetermined threshold.

8. The method of administering a storage system as recited in claim 5, further comprising collecting the logical storage device load information and the micro-processor package load information from other micro-processor packages, and changing the ownership by considering said information.

* * * * *